US010148575B2

(12) United States Patent
Mehra et al.

(10) Patent No.: US 10,148,575 B2
(45) Date of Patent: *Dec. 4, 2018

(54) ADAPTIVE LOAD BALANCING IN PACKET PROCESSING

(71) Applicant: Telefonaktiebolaget L M Ericsson (publ), Stockholm (SE)

(72) Inventors: Ashwani Kumar Mehra, Bangalore (IN); Prashant Anand, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 284 days.

This patent is subject to a terminal disclaimer.

(21) Appl. No.: 14/681,022

(22) Filed: Apr. 7, 2015

(65) Prior Publication Data

US 2016/0182380 A1 Jun. 23, 2016

Related U.S. Application Data

(63) Continuation-in-part of application No. 14/579,722, filed on Dec. 22, 2014.

(51) Int. Cl.
*H04L 12/803* (2013.01)
*H04L 12/911* (2013.01)
(Continued)

(52) U.S. Cl.
CPC ............ *H04L 47/125* (2013.01); *H04L 45/74* (2013.01); *H04L 45/7453* (2013.01); *H04L 47/783* (2013.01)

(58) Field of Classification Search
None
See application file for complete search history.

(56) References Cited

U.S. PATENT DOCUMENTS 7,216,348 B1 * 5/2007 deCarmo ............... G06F 9/5083
  370/237
7,565,651 B1 7/2009 Carey
(Continued)

FOREIGN PATENT DOCUMENTS

EP  2 819 009 A2  12/2014
GB  2 505 051 A   2/2014

OTHER PUBLICATIONS

Guoyu Ou et al., "DM-Midware: A Middleware to Enable High Performance Data Mining in Heterogeneous Cloud", 2013 IEEE/WIC/ACM International Conferences on Web Intelligence (WI) and Intelligent Agent Technology (IAT), IEEE Computer Society, vol. 3, Nov. 17, 2013, pp. 70-73.
(Continued)

*Primary Examiner* — Younes Naji
(74) *Attorney, Agent, or Firm* — Nicholson De Vos Webster & Elliott LLP

(57) ABSTRACT

A method of forwarding packets in a network device is disclosed. The method comprises assigning a packet to a first packet processing thread; and determining a state of the first packet processing thread. Responsive to determining that the state of the first packet processing thread is a backlogged state, mapping the packet to a second packet processing thread from a pool of packet processing threads based on a load balancing scheme, wherein the pool of packet processing threads includes a subset of threads from the plurality of packet processing threads, and the state of each one of the packet processing threads from the pool is the backlogged state, processing the packet in the second packet processing thread, and forwarding the packet according to a predetermined order that is based on a position of the packet relative to positions of other packets at their receipt in the network device.

19 Claims, 12 Drawing Sheets

(51) Int. Cl.
H04L 12/741 (2013.01)
H04L 12/743 (2013.01)

(56) References Cited

U.S. PATENT DOCUMENTS

| | | | |
|---|---|---|---|
| 8,144,587 | B2 | 3/2012 | Heinz et al. |
| 9,450,881 | B2 | 9/2016 | Dumitrescu et al. |
| 2005/0041595 | A1 | 2/2005 | Uzun et al. |
| 2006/0187965 | A1 | 8/2006 | Lee et al. |
| 2007/0136311 | A1* | 6/2007 | Kasten ............... H04L 67/1008 |
| 2008/0198746 | A1* | 8/2008 | Kwan ..................... H04L 47/10 370/231 |
| 2010/0157800 | A1 | 6/2010 | Liu et al. |
| 2011/0116443 | A1* | 5/2011 | Yu ......................... H04L 12/413 370/328 |
| 2012/0297216 | A1* | 11/2012 | Olszewski ............ G06F 1/3206 713/320 |
| 2013/0185378 | A1 | 7/2013 | Giacomoni et al. |
| 2013/0188494 | A1 | 7/2013 | Mekkattuparamban et al. |
| 2013/0347005 | A1* | 12/2013 | Lam ....................... G06F 9/542 719/318 |
| 2016/0173338 | A1* | 6/2016 | Wolting ............... H04L 41/145 709/223 |

OTHER PUBLICATIONS

J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 198 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
D. Thaler, et al., "Multipath Issues in Unicast and Multicast Next-Hop Selection," Nov. 2000, 9 pages, Network Working Group, Request for Comments: 2991, The Internet Society.
C. Hopps, "Analysis of an Equal-Cost Multi-Path Algorithm," Nov. 2000, 8 pages, Network Working Group, Request for Comments: 2992, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 Pages, Network Working Group, Request for Comments: 3209, The Internet Society.
B. Davie, et al., "An Expedited Forwarding PB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffsery Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.

(56) References Cited

OTHER PUBLICATIONS

J. Babiarz, et al., "Configuration Guidelines for DiffServ Service Classes," Aug. 2006, 57 pages, Network Working Group, Request for Comments: 4594, The Internet Society.

K. Kompella, et al., "Virtual Private Lan Service (VPLS) Using BGP for Auto-Discovery and Signaling," Jan. 2007, 28 pages, Network Working Group, Request for Comments: 4761, The IETF Trust.

M. Lasserre, et al., "Virtual Private Lan Service (VPLS) Using Label Distribution Protocol (LDP) Signaling," Jan. 2007, 31 pages, Network Working Group, Request for Comments: 4762, The IETF Trust.

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

"Network Functions Virtualisation, Introductory White Paper", Issue 1, Oct. 22-24, 2012 at the SDN and OpenFlow World Congress, Darmstadt-Germany, 16 pages.

Estan, et al., "New Directions in Trac Measurement and Accounting: Focusing on the Elephants, Ignoring the Mice", ACM Transactions on Computer Systems, vol. 21, No. 3, Aug. 2003, pp. 270-313.

Floyd, Sally et al., "Random Early Detection Gateways for Congestion Avoidance", IEEE/ACM Transactions on Networking, vol. 1, No. 1, Aug. 1993, 22 pages.

* cited by examiner

Fig. 7F Single VNE 770T

ADAPTIVE LOAD BALANCING IN PACKET PROCESSING

CROSS-REFERENCE TO RELATED APPLICATIONS

This application is a continuation-in-part of U.S. patent application Ser. No. 14/579,722 filed on Dec. 22, 2014, the entire contents of which are hereby incorporated by reference for all purposes.

FIELD

Embodiments of the invention relate to the field of networking; and more specifically, to the adaptive load balancing of packets in a packet processing system.

BACKGROUND

Network functions virtualization (NFV) is a network architecture concept that implements specific functions or entire classes of network device functions as building blocks that may be connected, or chained, together to create communication services. These functions are implemented in a virtualized software environment that enables their distribution to and execution on commodity hardware deployed within a network.

NFV relies upon, but differs from, traditional server virtualization techniques such as those used in enterprise level software. A virtualized network function, or VNF, may be implemented via one or more virtual machines running different software and processes, on top of standard network device or server architectures, such as switches and storage systems, or even in a cloud computing infrastructure, instead of having custom hardware appliances for each network function.

A VNF may be implemented to perform packet processing and forwarding of Layer 2, Layer 2.5 or Layer 3 traffic and may be referred to as a Forwarding VNF. Packets received at a network element implementing a forwarding VNF are distributed to packet processing threads performing the forwarding task. The packet processing threads may use a run-to-completion model, where each thread runs an instance of a forwarding software (e.g., Ingress/Egress or Collapsed Ingress/Egress functionality). Various approaches may be used to distribute packets to the packet processing threads.

SUMMARY

A method of forwarding packets in a network device is disclosed. The method comprises receiving a packet at the network device; assigning the packet to a first packet processing thread from a plurality of packet processing threads; and determining a state of the first packet processing thread, wherein the state was set based on a monitoring of a length of a queue of the first packet processing thread, and wherein the state is determined to be one of a plurality of states including a backlogged state and a normal state. In response to determining that the state of the first packet processing thread is a normal state, the method further comprises mapping the packet to the first packet processing thread, processing the packet in the first packet processing thread, and forwarding the packet. In response to determining that the state of the first packet processing thread is a backlogged state, the method comprises mapping the packet to a second packet processing thread from a pool of packet processing threads based on a load balancing scheme, wherein the pool of packet processing threads includes a subset of packet processing threads from the plurality of packet processing threads, and the state of each one of the packet processing threads from the pool is the backlogged state, processing the packet in the second packet processing thread, and forwarding the packet according to a predetermined order, wherein the predetermined order is based on a position of the packet relative to positions of other packets at their receipt in the network device.

A non-transitory machine-readable storage medium that provides instructions, which when executed by a processor of a network device, cause said processor to perform operations which comprise assigning a received packet to a first packet processing thread from a plurality of packet processing threads; and determining a state of the first packet processing thread, wherein the state was set based on a monitoring of a length of a queue of the first packet processing thread, and wherein the state is determined to be one of a plurality of states including a backlogged state and a normal state. In response to determining that the state of the first packet processing thread is a normal state, the operations further comprise mapping the packet to the first packet processing thread, processing the packet in the first packet processing thread, and causing the packet to be forwarded. In response to determining that the state of the first packet processing thread is a backlogged state, the operations further comprise mapping the packet to a second packet processing thread from a pool of packet processing threads based on a load balancing scheme, wherein the pool of packet processing threads includes a subset of packet processing threads from the plurality of packet processing threads, and the state of each one of the packet processing threads from the pool is the backlogged state, processing the packet in the second packet processing thread, and causing the packet to be forwarded according to a predetermined order, wherein the predetermined order is based on a position of the packet relative to positions of other packets at their receipt in the network device.

A network device is disclosed. The network device comprises a processor; and a non-transitory machine readable storage media with code stored therein which when executed by the processor performs the operations including assigning a received packet to a first packet processing thread from a plurality of packet processing threads, determining a state of the first packet processing thread, wherein the state was set based on a monitoring of a length of a queue of the first packet processing thread, and wherein the state is determined to be one of a plurality of states including a backlogged state and a normal state. In response to determining that the state of the first packet processing thread is a normal state, the operations further include mapping the packet to the first packet processing thread, processing the packet in the first packet processing thread, and causing the packet to be forwarded. In response to determining that the state of the first packet processing thread is a backlogged state, the operations further include mapping the packet to a second packet processing thread from a pool of packet processing threads based on a load balancing scheme, wherein the pool of packet processing threads includes a subset of packet processing threads from the plurality of packet processing threads, and the state of each one of the packet processing threads from the pool is the backlogged state, processing the packet in the second packet processing thread, and causing the packet to be forwarded according to a predetermined order, wherein the predetermined order is based on a position of the packet relative to positions of other packets at their receipt in the network device.

The embodiments of the disclosed techniques provide an adaptive packet processing mechanism in a network device that aims to provide high performance packet processing by selecting between a direct flow mapping and load balancing mapping for each flow received based on a state of a packet processing thread assigned to the packets. The embodiments of the disclosed techniques allow for a high portion of the flows to be processed according to a direct mapping (flow—thread), avoiding the cost of reordering for that portion of the flows. The embodiments of the disclosed techniques further allow load balancing flows over a subset of the packet processing threads only when needed. Thus, the adaptive packet processing re-orders the packets only when needed.

BRIEF DESCRIPTION OF THE DRAWINGS

The invention may best be understood by referring to the following description and accompanying drawings that are used to illustrate embodiments of the invention. In the drawings:

FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 1:
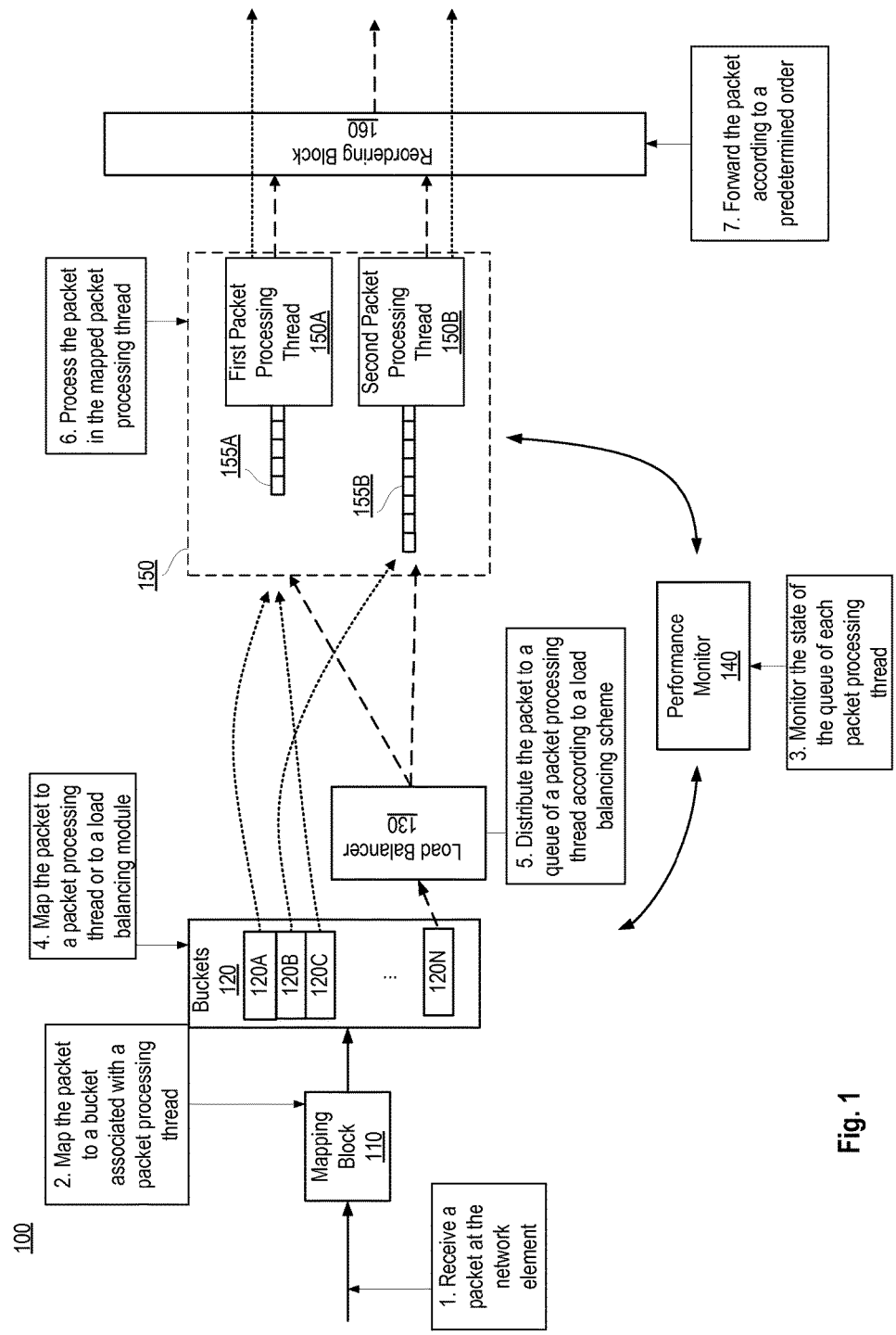
FIG. 1 illustrates operations in a network device for adaptive load balancing in packet processing according to some embodiments of the invention.

The following description describes methods and apparatuses for dynamically load balancing packets in packet processing. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A network device (ND) may include one or more network elements, as described in more details herein below.

Challenges of Flow Distribution in Packet Processing

In a network device implementing a forwarding network element, packets received may be classified and mapped to packet processing threads. For example, the forwarding network element is part of a forwarding plane in a packet forwarding architecture. The forwarding network element may be implemented to include one or more packet processing threads performing the forwarding tasks. Each packet processing thread performs a set of applicable lookup and forwarding functions on the received packets. A forwarding network element needs to ensure that packets of a flow do not get reordered by the network element during the forwarding process and are output in the same order they were received at the network element. Some approaches may be used to distribute the packets received at the network element over the packet processing threads.

According to a first approach, packets of a flow are mapped to the same packet processing thread for processing. In this example, the packets are processed in the packet processing thread and output from the network element in the order they are received. However, this approach does not perform well when there is a burst of packets from the same flow or when the flow is a heavy flow (sometimes referred to as an "elephant flow"), resulting in the oversubscription of the packet processing thread which may lead to packet drops. Elephant flows may take a large proportion (or all) of the processing time of the packet processing thread. In addition, the packet processing thread may get oversubscribed even in the absence of heavy flows, when a number of relatively heavy packet flows or a large number of flows (hashing skew) are mapped to the same packet processing thread. The oversubscription of a packet processing thread will lead to having the thread's queue backlogged and resulting in packet drops, while other packet processing threads in the network element may still have enough computing cycles available for processing the packets.

A second approach is performed to avoid the oversubscription of a packet processing thread as discussed in the above mentioned examples. In this second approach, packets received at the network element are distributed to a packet processing thread according to a load balancing technique. According to this approach, all packets received regardless of whether they are from a heavy flow or not are load balanced. As different packet processing threads may take a different amount of time to process each packet, packets of a flow may need to be reordered prior to being output to ensure that they are forwarded by the network element in the same order they were received. According to one approach, sequence numbers may be assigned to packets at ingress of the network element. The assigned sequence numbers can be used to re-order the packets after their processing and before their output from the network element. To ensure that the packets are reordered following their processing, all packets, which have at least one preceding packet not processed yet, are stored in a global buffering area. Thus, all packets received and processed in the packet processing threads are potentially queued in the global buffering area to be reordered prior to their output. The reordering can be implemented either as an inline function executed in the context of a packet processing thread or as a separate thread, where all packet processing threads add the processed packets to the queue of the reordering thread. In this later example, the reordering thread continues to service this queue and either adds the packet to the buffering area or transmits the packet out of the network element if all of its preceding packets have already been processed. In the approach where all packets are load balanced, the packets belonging to all flows are penalized as they are all load balanced and potentially all need to be reordered prior to being output by the network element. The penalty is applicable even if the load balancing is needed only for very few flows (e.g., the heavy flows) and a majority of flows could be transmitted without resorting to load balancing and reordering. Further in the example where the reordering is implemented as an inline function, a global synchronization across the packet processing threads to access the relevant staging area (i.e., buffering area) is needed.

Adaptive Load Balancing in Packet Processing

Given the challenges of implementing high performance packet processing, it is desirable to have an adaptive load balancing in a packet processing network element which allows efficient forwarding of packets and performs re-ordering of packets only when needed.

FIG. 1 illustrates operations in a network device for an adaptive load balancing of packets according to one embodiment of the invention. The network device includes a network element 100 configured or adapted to include a mapping block 110, one or more buckets 120, a load balancer 130, a performance monitor module 140, a set of one or more packet processing threads 150 and a reordering block 160. Task boxes 1 to 7 illustrate the order in which operations are performed according to one embodiment of the invention.

At task box 1, a packet is received at the network element. The packet is received through a network interface and forwarded to the mapping block 110. At task box 2, the mapping block 110 maps the packet to one of the buckets 120A-N. In one embodiment, each one of the buckets 120A-N is associated with one of the packet processing threads 150A-B. For example, upon receipt of a packet, the mapping block 110 may map the packet to the bucket 120A which is associated with the first packet processing thread 150A. In another example, upon receipt of the packet, the mapping block 110 may map the packet to the bucket 120N, which in turn is associated with the second packet processing thread 150B (not illustrated).

At task box 3, the performance monitor 140 determines whether the packet processing thread associated with the bucket is oversubscribed. Each of the packet processing threads 150A and 150B has a respective queue 155A-155B, for receiving the packets. According to some embodiments, each one of the buckets 120 is associated with a queue of a packet processing thread and feeds this queue with incoming packets to process. The performance monitor 140 monitors the state of each queue and determines whether the queue is backlogged.

Once the performance monitor 140 determines whether each of the packet processing threads 150A or 150B is oversubscribed or not, the buckets are configured at task box 4 to map the packet to one of the packet processing threads 150. The packet of a bucket (e.g., the bucket 120A) may be mapped to the packet processing thread associated with the bucket (e.g., as illustrated in FIG. 1, to the first packet processing thread 150A). Alternatively, the packet may be mapped to the load balancer 130 before being further mapped to one of the packet processing threads 150 according to a load balancing method. The choice between a direct mapping (bucket—associated thread) or a load-balancing mapping (bucket-load balancer—packet processing thread) is determined by the state of the packet processing thread associated with the bucket. When the performance monitor 140 determines that a packet processing thread is oversubscribed, at task box 5, the packets of the bucket associated with the thread are distributed across multiple packet processing threads according to the method implemented in the load balancer 130. When the performance monitor 140 determines that a packet processing thread is not oversubscribed, the packets of the bucket associated with the thread are mapped to the packet processing thread (i.e., direct mapping).

At task box 6, the packets of each queue 155A-155B are processed in the corresponding packet processing thread 150A-150B. In one embodiment, each packet processing thread runs on a different processor core. In an alternative embodiment, two or more threads may run on a single processor core. Each packet processing thread 150A-B processes a packet according to forwarding table(s) such that the packets are output to the appropriate physical network interfaces (NIs) or dropped. While two packet processing threads 150A and 150B are illustrated in FIG. 1, alternative embodiments of the invention could have any number of packet processing threads.

At task box 7, the packet is forwarded (i.e., dropped or output to the appropriate NI) according to a predetermined order. The order is based on the position of the packet relative to other packets at their receipt at the network element. In accordance with one embodiment, packets of a flow are received in a determined order ("ingress order"), mapped to the same bucket, and directly mapped to the same packet processing thread. In this embodiment, the packets may be output in this same order without needing any reordering in the reordering block 160. In some of these embodiments, the reordering block 160 may be skipped and the packets output following their processing in the packet processing thread. In accordance with another embodiment, packets of a flow are received in the ingress order and they are load balanced through multiple packet processing threads instead of being directly mapped to a single packet processing thread. This may occur, for example, when the associated packet processing thread is determined to be oversubscribed. In this example, the packets may be output from the packet processing threads in a different order than the ingress order. Thus, the packets are reordered prior to being forwarded to ensure that they are output from the network element according to the ingress order.

Even though the tasks of the task boxes 1-7 are described in a sequential order, some tasks may be performed concurrently or in a different order than described above. For example, monitoring the state of the queues may be performed periodically and simultaneously to the mapping of the packets to a packet processing thread (either directly-task box 4, or indirectly-task box 5). In other embodiments, additional or fewer tasks may be performed.

Flow Diagrams for Implementing Adaptive Load Balancing in Packet Processing

As described herein above, the network element is configured or adapted to perform an adaptive load balancing in packet processing. The packets of a flow received at the network element are mapped to an associated packet processing thread. The packets are alternatively distributed across multiple packet processing threads when their associated packet processing thread is oversubscribed and its queue backlogged. Packets of a flow may dynamically shift from being mapped to the packet processing thread or being load balanced across multiple threads in response to a change in the load of the associated packet processing thread.

The operations of the network element implementing adaptive load balancing in packet processing will be described with reference to the flow diagrams of FIG. 2 and FIG. 3. However, it should be understood that the operations of the packet processing module 100 can perform operations other than those discussed with reference to the flow diagrams of FIG. 2 and FIG. 3, and the embodiments discussed with reference to the flow diagrams of FIG. 2 or FIG. 3 can be performed by embodiments of the invention other than those discussed with reference to FIG. 1.

Figure 2:
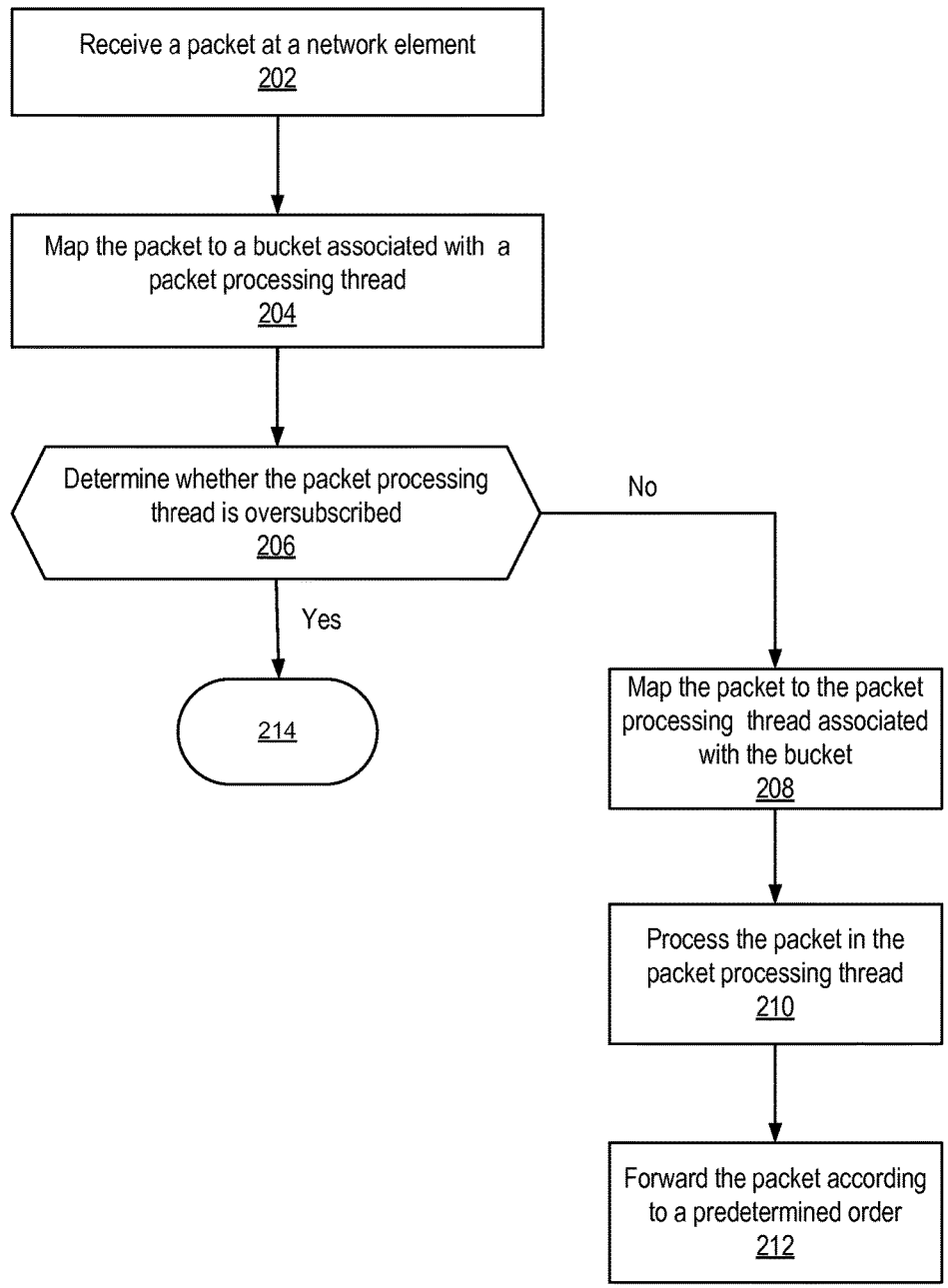
FIGS. 2-3 illustrate flow diagrams of operations for performing adaptive load balancing in a network device according to some embodiments of the invention.
Figure 3:
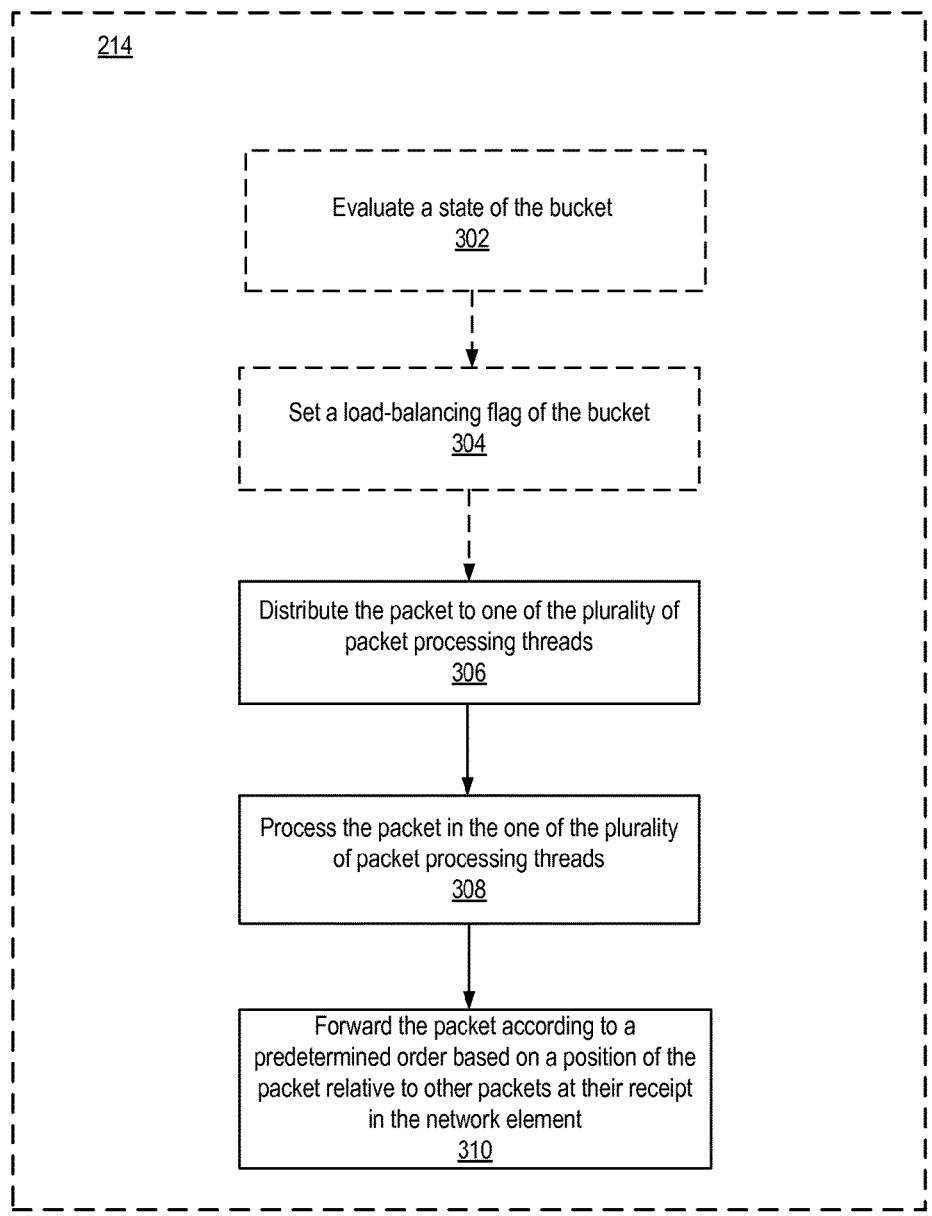

FIGS. 2-3 illustrate flow diagrams of operations for performing adaptive load balancing in a network device according to one embodiment of the invention. At block 202, a packet is received at the network element implemented in the network device. In some embodiments, the packet is received at a network interface (NI) and forwarded to the mapping block 110. Flow then moves to block 204.

At block 204, the mapping block 110 maps the packet to one of the buckets 120A-N. In one embodiment, each one of the buckets 120A-N is associated with one of the packet processing threads 150A-B. For example, upon receipt of a packet, the mapping block 110 may map the packet to the bucket 120A, which is associated with the first packet processing thread 150A. In another example, upon receipt of the packet, the mapping block 110 may map the packet to the bucket 120N, which in turn is associated with the second packet processing thread 150B (not illustrated). In one embodiment, the mapping is performed according to a hashing mechanism and the buckets are hash buckets. For example, information from the IP header of a packet (such as the destination address, the source address, the port number, etc.) may be used as indexes in a hashing table to retrieve a bucket identification for mapping the packets.

A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. In accordance with one embodiment, packets of a flow are mapped to the same bucket. Further, one or more flows may be mapped to the same bucket.

At block 206, the performance monitor 140 determines whether the packet processing thread associated with the bucket is oversubscribed. As illustrated in FIG. 1, each of the packet processing threads 150A and 150B has a queue 155A-155B, respectively, for receiving the packets to be processed. According to some embodiments, each one of the buckets 120 is associated with a queue of a packet processing thread and feeds this queue with packets. The performance monitor 140 is configured to monitor the state of each queue and to determine whether the queue is backlogged or not. According to some embodiments, in order to determine the state of a packet processing thread, the performance monitor 140 measures the length of its associated queue at a given instant and determines whether the queue length is above a predetermined threshold. According to an alternative embodiment, in order to determine the state of a packet processing thread, the performance monitor 140 determines an Exponentially Weighted Moving Average (EWMA) Queue Length for its associated queue. The EWMA average queue length provides a measure of the average queue length over a determined period of time, which allows the performance monitor 140 to account for and ignore short bursts of packets in otherwise well-behaved flows. The performance monitor 140 determines whether the EWMA queue length is above a predetermined threshold to determine whether the corresponding queue is backlogged and the packet processing thread is oversubscribed.

When the performance monitor 140 determines at block 206 that a packet processing thread 150A or 150B is oversubscribed, flow moves to operation 214. Alternatively, when the performance monitor 140 determines at block 206 that the packet processing thread is not oversubscribed, flow moves to operation 208. In some embodiments, the monitoring of the queues 155A-155B is performed on a periodic basis, and whenever an irregular behavior of the queue is determined (e.g., the EWMA queue length is above a predetermined threshold), flow moves to block 214.

At block 208, the packets included in the bucket associated with the packet processing thread are mapped to the corresponding thread. In one embodiment of the invention, upon monitoring the state of the queue 155A, the performance monitor 140 determines that the packet processing thread 150A is not oversubscribed. The packets mapped to the bucket 120A are then directly mapped to their corresponding packet processing thread 150A and are added to the corresponding queue 155A. Flow then moves from block 208 to block 210 where the packets of the queue are processed in the packet processing thread.

In one embodiment, each packet processing thread runs on a different processor core. In an alternative embodiment, two or more threads may run on a single processor core. The packet processing threads 150A-B are configured to make forwarding decisions and to perform an action on a packet, based upon an entry in a forwarding table, by executing a set of actions identified in the matched forwarding table entry on the packet. The entry of the forwarding table may be identified during a packet classification operation (not illustrated in FIG. 1). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

The packet processing threads 150 may further be configured or adapted to include forwarding features such as quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing). In one embodiment, the packet processing threads 150 may forward the packets with any required encapsulation modifications. For example, packet processing threads of a network element implementing IP router functionality may forward, modify, drop, delay, or otherwise operate on IP packets on the basis of some of the IP header information in the IP packet, where IP header information includes source IP address, destination IP address, source port, destination port (where "source port" and "destination port" refer herein to protocol ports, as opposed to physical ports of a ND), transport protocol (e.g., user datagram protocol (UDP) (Internet Engineering Task Force (IETF) Request for Comments (RFC) 768, 2460, 2675, 4113, and 5405), Transmission Control Protocol (TCP) (IETF RFC 793 and 1180), and differentiated services (DSCP) values (IETF RFC 2474, 2475, 2597, 2983, 3086, 3140, 3246, 3247, 3260, 4594, 5865, 3289, 3290, and 3317). While the embodiments above have been described in relation to two packet processing threads 150A and 150B, alternative embodiments could have any number of packet processing threads.

Flow then moves from operation 210 to 212. At block 212, following the processing of the packets in the packet processing threads, the packets are forwarded according to a predetermined order (unless the forwarding decision made at the preceding operation was to drop the packet). Referring back to operation 204, according to one embodiment, the packets of a single flow are mapped to the same bucket (e.g., bucket 120A). According to this embodiment, if the packet processing thread 150A associated with the bucket 120A is determined not to be oversubscribed, the packets mapped to the bucket 120A are added to the queue 155A and are processed in the order they are received at the network element (i.e., the ingress order) and can therefore be output in the same order. According to an alternative embodiment, the packets from multiple flows are mapped to the same bucket 120A. In this alternative embodiment, if the packet processing thread 150A associated with the bucket 120A is determined not to be oversubscribed, the packets of each one of the flows are mapped to the queue 155A. The packets are then processed in the ingress order and are therefore output in the same order.

In the embodiments described immediately above, the packets of a flow are processed in the same order they were received in the network element and re-ordering of the packets is not needed prior to their output. The order of output is defined by the position of a packet relative to the other packets of the same flow at their receipt in the network element. Alternatively, the order of output is defined by the position of a packet relative to the other packets from the multiple flows mapped to the same bucket, at their receipt in the network element. Thus, the need for outputting processed flows according to the ingress order is met by the network element while providing an efficient forwarding of the packets when the queues of the packet processing threads are not backlogged.

Referring back to operation 206, when the performance monitor 140 determines that a packet processing thread (e.g., the packet processing thread 150B) is oversubscribed, flow moves from block 206 to block 214. FIG. 3 illustrates detailed operations performed in the network element when a packet processing thread is determined to be oversubscribed according to one embodiment of the invention. At block 302, the performance monitor 140 evaluates a state of the bucket(s) associated with the oversubscribed thread to determine if the bucket(s) is the cause of the oversubscription. For example, the performance monitor 140 may determine whether a state of a bucket(s) is above a predetermined threshold. The state of the bucket may be evaluated based on a counter value for the bucket, wherein the counter value is indicative of the number of packets in the bucket and/or an exponentially weighted moving average (EWMA) value of the packet rate for the bucket. In one example, packet counters and/or a EWMA packet increment are maintained for each bucket. The EWMA packet increment may be determined with sampling of delta packets received at periodic time intervals. This EWMA packet increment is an indication of the number of packets mapped to a hash bucket in a recent past. Upon determination that the packet processing thread is oversubscribed, the performance monitor 140 may evaluate the state of each bucket mapped to the oversubscribed thread.

In one embodiment, a single bucket is associated with the oversubscribed packet processing thread. In this embodiment, upon determination that the queue is backlogged, flow moves to block 304. In another embodiment, multiple buckets are associated with the oversubscribed packet processing thread and the performance monitor 140 determines which bucket (or buckets if more than one bucket cause the oversubscription) has a state above the predetermined threshold. For example, buckets with EWMA packet increment which have a value higher than a predetermined threshold sent proportionally higher traffic in the recent past to the packet processing thread and need to be load-balanced. A bucket 120 may cause the oversubscription of a packet processing thread if a heavy flow (e.g., an elephant flow) is mapped to the bucket or when the mapping method (implemented in the mapping block 110) leads to mapping a large number of flows (hashing skew) to the same bucket.

At block 304, a load-balancing flag is set for each bucket which was determined to cause the oversubscription of the packet processing thread. In one embodiment, as illustrated in FIG. 1, a single bucket may be the cause of the oversubscription and therefore the load-balancing flag of the bucket 120N is set while the load-balancing flags of the buckets 120A, 120B and 120C are not set (i.e., cleared). In another embodiment, more than one bucket may be the cause of the oversubscription (not illustrated), and each one of their load-balancing flag is set. In all embodiments, the load-balancing flags of buckets which did not cause the oversubscription are cleared. In addition, when a load-balancing flag of a bucket is set, it is an indication that the bucket needs to be load balanced. In one embodiment, the states of the load balanced buckets are monitored on a periodic basis, and when a state decreases below the predetermined threshold, the load-balancing flag is cleared and the corresponding bucket shifts to a direct mapping mode of operation in which flows are directly mapped to the associated packet processing thread without being load balanced. In some embodiments, the load balancing flag of a bucket is cleared when the associated packet processing thread is no longer determined to be oversubscribed. The performance monitor 140 may, upon determination that the queue of the thread is no longer backlogged, cause the load balancing flag of the associated bucket to be cleared. Flow moves from block 304 to block 306.

Going back to block 206 from FIG. 2, in an alternative embodiment, upon determination of the oversubscription of a packet processing thread, block 302 and/or 304 may be skipped and block 306 is performed directly following the performance of block 206.

According to these embodiments, the state of the bucket is dynamically shifted from a first mode ("direct mapping"), in which packets of a flow are mapped to the same packet processing thread, to a second mode ("load balancing"), in which the packets of the flow are distributed over multiple packet processing threads. The shift of the bucket from the first mode to the second mode is based on the determination of whether the queue of the packet processing thread associated with the bucket is backlogged or not. Additionally, the shift of the bucket from the second mode to the first mode may be based on the state of the bucket and/or the state of its associated thread's queue. The periodic monitoring of the queue of a thread and/or of the state of a bucket allows for dynamically setting the bucket in the appropriate mode such that forwarding of packets is performed efficiently while avoiding load balancing flows when not needed. The periodic monitoring of the thread's queue allows for dynamic distribution of packets of a flow to a packet processing thread according to the appropriate mode (i.e., direct mapping or load balancing) such that the packets are processed efficiently, in the network element, while avoiding load balancing of flows and reordering of packets when not needed.

At block 306, a packet included in the bucket(s) associated with the oversubscribed packet processing thread is forwarded to the load balancer 130. For example, the packets of the bucket 120N are forwarded to the load balancer 130 upon determination by the performance monitor 140 that the packet processing thread 150B is oversubscribed. The packets are then distributed over the multiple packet processing threads 150 for processing, according to a load balancing mechanism.

In one embodiment, the packets are distributed over all the packet processing threads (e.g., 150A and 150B). Alternatively, the packets are distributed to a subset of the packet processing threads 150. For example, if the thread 150B is determined to be oversubscribed, the load balancer may be configured to distribute the packets to all the packet processing threads except the oversubscribed thread 150B. The load balancing of the packets of a bucket may be performed according to a Round-Robin mechanism, a random distribution mechanism, or another distribution mechanism which may take additional factors into account (e.g., heuristics, current workloads, queue lengths at the packet processing threads, etc.). According to one embodiment, packets of a single flow are included in the bucket and are distributed over multiple packet processing threads. In another embodiment, packets of multiple flows are included in the bucket and distributed over multiple packet processing threads. Flow then moves to block 308.

At block 308, a packet is processed in the packet processing thread at which it was assigned. The processing of the packet in the packet processing thread at block 308 may be similar to processing performed at block 210. Flow then moves to block 310.

Figure 5:
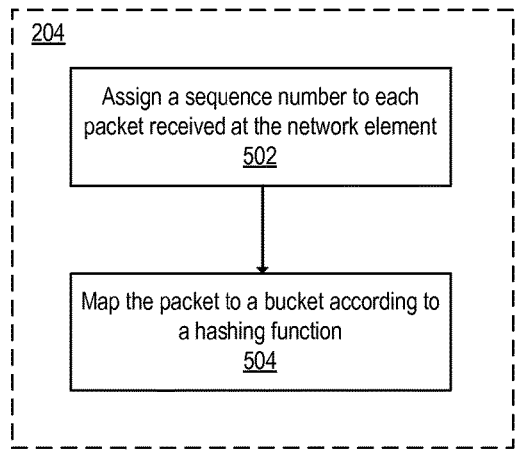
FIG. 5 illustrates a flow diagram of detailed operations performed in the network device when a packet processing thread is mapped to a bucket according to some embodiments of the invention.
Figure 6:
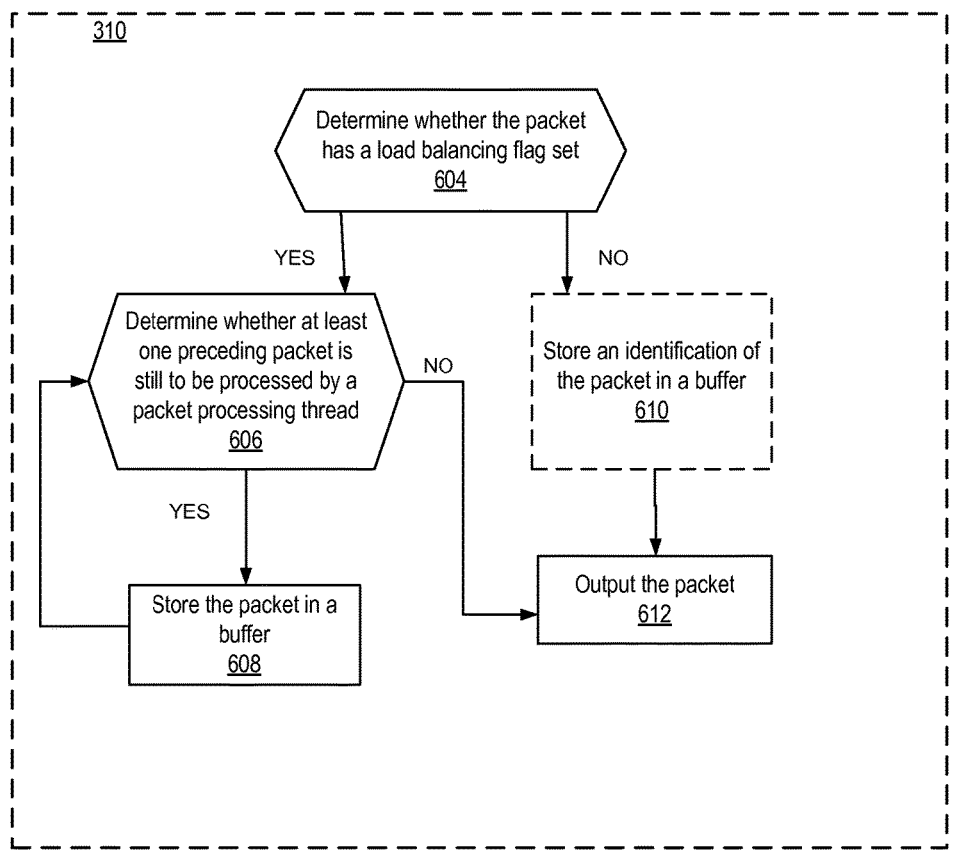
FIG. 6 illustrates a flow diagram of detailed operations performed in the network device for reordering the packets according to some embodiments of the invention.

At block 310, the packet is forwarded (e.g., output via the appropriate NI unless it is dropped) according to a predetermined order. The predetermined order is based on the position of the packet relative to other packets at their receipt in the network element. According to one embodiment, the packet is forwarded according to its position relative to other packets of the same flow at their receipt in the network element. In another embodiment, the packet is forwarded according to its position relative to other packets of multiple flows, at their receipt in the network element. The processing of the packets may take varying amounts of time from one thread to another. Consequently, re-ordering of the packets may be needed prior to their output from the network element to ensure that the packets are forwarded according to their ingress order. The reordering block 160 receives the packets processed in the multiple packet processing threads and performs the reordering of the packets of a flow (or aggregate flows) prior to forwarding the packets. For each packet received, the reordering block 160 determines whether all packets received at the network element before the packet were reclaimed (dropped or output to the appropriate network interface) prior to outputting the packet. Multiple mechanisms may be used to implement the reordering block 160. In accordance with some embodiments, the packets may be reordered according to assigned sequence numbers. The sequence numbers may be assigned within the network element at receipt of the packets, or prior to their receipt in the network element. For example, the sequence numbers may be part of meta-data of the packets. The embodiments described with reference to FIG. 4, FIG. 5, and FIG. 6 illustrate exemplary embodiments for performing reordering of load balanced packets in a network element.

Packet Sequencing and Re-Ordering

Figure 4:
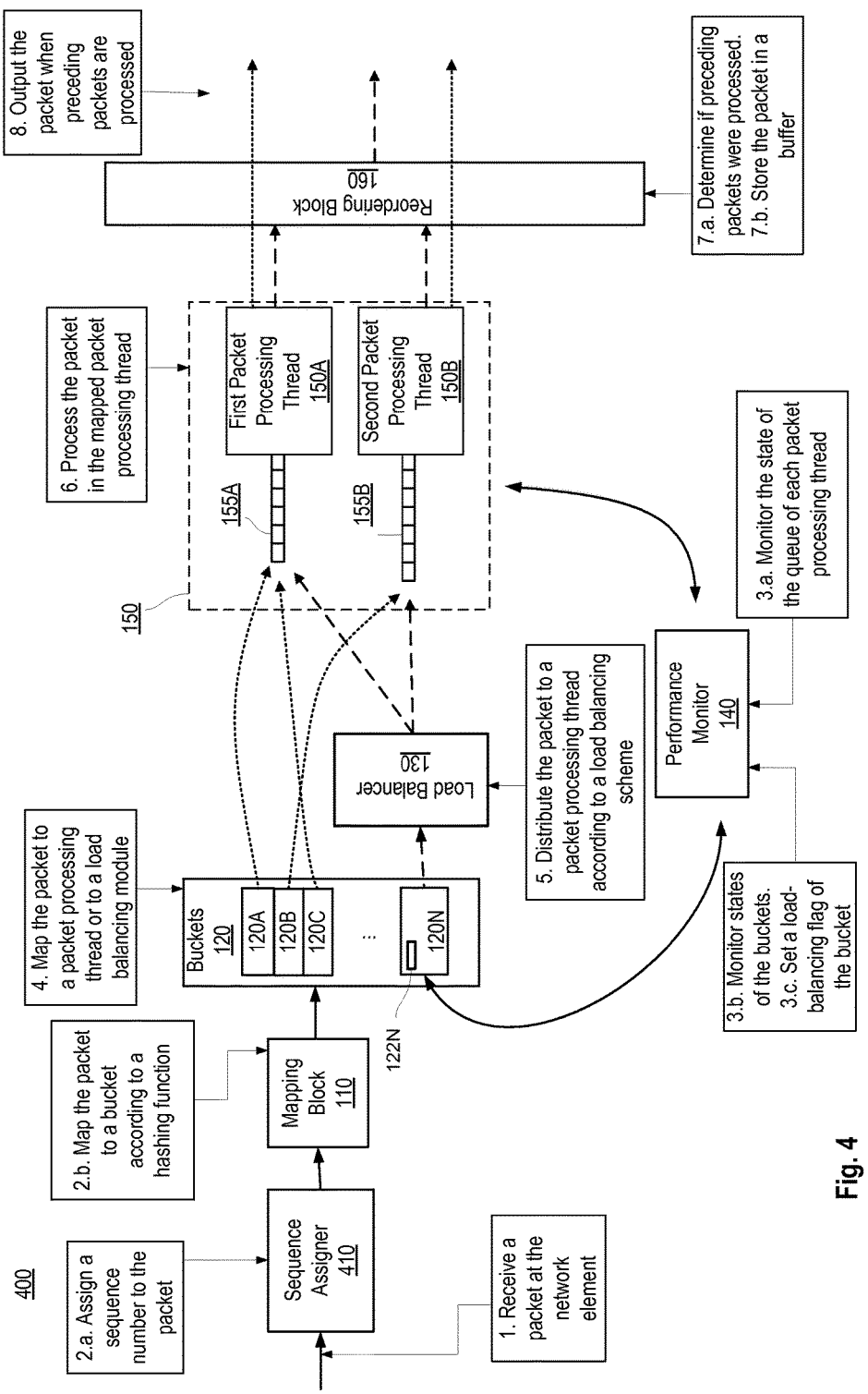
FIG. 4 illustrates operations in a network device for adaptive load balancing in packet processing according to some embodiments of the invention.

FIG. 4 illustrates operations in a network device for adaptive load balancing in packet processing according to one embodiment of the invention. FIG. 4 contains elements and task boxes similar to FIG. 1. The same or similar references indicate elements or components having the same or similar functionalities. In addition to the modules described with reference to FIG. 1, the network element 400 is further configured to include a sequence assigner 410. Task boxes 1 to 8 illustrate the order in which operations are performed according to one embodiment of the invention.

At task box 1, a packet is received at the network element. The packet is received through a network interface and forwarded to the sequence assigner 410. At task box 2.*a*., a sequence number is assigned to each incoming packet. The sequence number assigned is later used at the reordering block 160 to ensure that the packets exit the network element in the same order they entered. According to one embodiment, the packets are assigned a sequence number on a flow basis, such that packets of the same flow are assigned different numbers of the same sequence. According to another embodiment, the packets are assigned a sequence number on an aggregate flow basis, such that packets of multiple flows are assigned different numbers of the same sequence (e.g., flows received at the same physical port, flows with the same protocol port, or all flows received at the network element, etc.). In some embodiments, prior to being assigned a sequence number, each packet may pass a validity check.

At task box 2.*b*., the mapping block 110 maps the packet to one of the buckets 120A-N, e.g., according to a hashing mechanism. In one embodiment, each one of the buckets 120A-N is associated with one of the packet processing threads 150A-B. For example, upon receipt of a packet, the mapping block 110 may map the packet to the bucket 120A which is associated with the first packet processing thread 150A. In another example, upon receipt of the packet, the mapping block 110 may map the packet to the bucket 120N, which in turn is associated with the second packet processing thread 150B (not illustrated). In accordance with some embodiments, the mapping block 110 may be configured or adapted to perform header parsing and packet classification. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case, the system is typically configured to determine one forwarding table entry from the many according to a defined scheme (e.g., selecting a first forwarding table entry that is matched).

At task box 3.*a*., the performance monitor 140 determines whether the packet processing thread associated with the bucket is oversubscribed. The performance monitor 140 tracks the state of each queue and determines whether the queue is backlogged. At task box 3.*b*., the performance monitor 140 is further configured or adapted to track the state of each bucket. The states of the buckets are indicative of the number of packets mapped to the bucket in a recent past. Upon determination of an oversubscription of a queue, the performance monitor 140 evaluates the state of the buckets and sets a load-balancing flag, at task box 3.*c*., for each bucket which is determined to cause the oversubscription of the queue.

Once the performance monitor 140 determines whether each of the packet processing thread 150A or 150B is oversubscribed or not, the buckets are configured or adapted at task box 4 to map the packet to one of the packet processing threads 150. The packets of a bucket (e.g., the bucket 120A) may be mapped to the packet processing thread associated with the bucket (e.g., as illustrated in FIG.

1, to the first packet processing thread 150A). Alternatively, the packets may be mapped to the load balancer 130 before being further mapped to one of the packet processing threads 150 according to a load balancing method. The choice between a direct mapping (bucket—associated thread) or a load-balancing mapping (bucket-load balancer-packet processing thread) is determined by the state of the packet processing thread associated with the bucket. When the performance monitor 140 determines that a packet processing thread is oversubscribed, the packets of the bucket associated with the thread are distributed across multiple packet processing threads according to the method implemented in the load balancer 130. When the performance monitor 140 determines that a packet processing thread is not oversubscribed, the packets of the bucket associated with the thread are mapped to the packet processing thread (i.e., direct mapping). According to another embodiment, the choice between direct mapping and load balancing mapping is further determined based on the state of the bucket and the load balancing flag. When the load-balancing flag of a bucket is set, the packets of the buckets are transmitted to the load balancer 130 for distribution over the multiple packet processing threads. When the load balancing flag of the bucket is cleared or not set, the packets are mapped directly to the associated packet processing thread.

At task box 6, the packets of each queue 155A-155B are processed in the corresponding packet processing thread 150A-150B. In one embodiment, each packet processing thread runs on a different processor core. In an alternative embodiment, two or more threads may run on a single processor core. Each packet processing thread 150A-B processes a packet according to forwarding table(s) such that the packets are output to the appropriate physical network interfaces (NIs) or dropped. While two packet processing threads 150A and 150B are illustrated in FIG. 1, alternative embodiments of the invention could have any number of packet processing threads.

At task box 7.*a*., upon receipt of a processed packet, the reordering block 160 determines whether the packets preceding the received packet were previously forwarded prior to forwarding the packet. The exit order of the packets is based on the sequence numbers assigned to the packets at the ingress of the network element. In some of these embodiments, the reordering block 160 may be skipped and the packets are output following their processing in the packet processing thread without being reordered. In other embodiments, when packets of a flow are distributed over multiple packet processing threads, they are no longer processed according to the sequence numbers assigned at task 2.*a*. In this example, the packets may be output from the packet processing threads in a different order than the ingress order. The packets are reordered prior to being forwarded to ensure that they are output from the network element according to the order assigned at ingress. At task box 8, the packets are output in the ingress order.

Even though the tasks of the task boxes 1-8 are described in a sequential order, some tasks may be performed concurrently or in a different order than described above. For example, monitoring the state of the queues may be performed periodically and simultaneously to the mapping of the packets to a packet processing thread (either directly—task box 4, or indirectly—task box 5). In other embodiments, additional or fewer tasks may be performed.

The operations in the flow diagrams of FIG. 5 and FIG. 6 will be described with reference to the exemplary embodiments of FIG. 4. However, it should be understood that the operations of the flow diagrams can be performed by embodiments of the invention other than those discussed with reference to FIG. 4, and the embodiments of the invention discussed with reference to FIG. 4 can perform operations different than those discussed with reference to the flow diagrams of FIG. 5 or FIG. 6.

FIG. 5 illustrates detailed operations performed in the network element when a packet processing thread is mapped to a bucket. At block 502, a sequence number is assigned to each incoming packet. The assigned sequence number is later used at the reordering block 160 to reorder packets of a flow and ensure that they exit the network element in the same order they entered. According to one embodiment, the packets are assigned sequence numbers on a flow basis, such that packets of the same flow are assigned different numbers from the same sequence. According to another embodiment, the packets are assigned a sequence number on an aggregate flow basis, such that packets of multiple flows are assigned different numbers of the same sequence (e.g., flows received at the same physical port, flows with the same protocol port, or all flows received at the network element, etc.). In one embodiment, all packets received at the network element are assigned a sequence number from a single global pool of numbers. In other words, all packets from the different flows received at the network element (received through one or more ports) are numbered according to this global pool. In another embodiment, distinct pools of sequence numbers may be used. Multiple flows may be grouped to be assigned numbers from a particular pool. For example, the packets may undergo a basic classification at ingress, and mapped to one of the sequence number pools. In this case, a pool identification (Pool ID) can be marked in the meta-data associated with the packets to identify the pool. The assigned sequence numbers and Pool ID are later used at the reordering block 160 to reorder packets of a flow and ensure that they exit the network element in the same order they entered with respect to their assigned pool. In some embodiments, prior to being assigned a sequence number, each packet may pass a validity check.

At block 504, the mapping block 110 maps the packet to one of the buckets 120A-N, e.g., according to a hashing mechanism. In accordance with some embodiments, the mapping block 110 may be configured or adapted to perform header parsing and packet classification. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry), in the forwarding tables, best matches the packet based upon the match structure, or key, of the forwarding table entries. It is possible that many flows represented in the forwarding table entries can correspond/match to a packet; in this case, the system is typically configured to determine one forwarding table entry from the many according to a defined scheme (e.g., selecting a first forwarding table entry that is matched).

In the illustrated embodiment of FIG. 4, each one of the buckets 120A-N is associated with one of the packet processing threads 150A-B. For example, upon receipt of a packet, the mapping block 110 may map the packet to the bucket 120A, which is associated with the first packet processing thread 150A. In another example, upon receipt of the packet, the mapping block 110 may map the packet to the bucket 120N, which in turn is associated with the second packet processing thread 150B (not illustrated). The mapping block 110 parses the packet header and performs a Hash Table Lookup to map the packet to a bucket (referred as a "hash bucket" herein). The hash bucket provides the packet processing thread which should process the packet. In one example, the mapping occurs via a hash table which has (N×Total Thread Count) entries, such that N buckets may be associated with a packet processing thread. The number N may be set to a reasonably large value (e.g., 16 or 32). The hash table will contain multiple N entries mapping to a single packet processing thread 150. The use of multiple buckets per packet processing thread allows the decomposition of sets of flows being mapped to that thread into smaller subsets (i.e., the buckets).

Each hash bucket is configured or adapted to have a load balancing flag which determines the mode of operation of the bucket. In one embodiment, when the load balancing flag is cleared or not set, the packets of the bucket are directly mapped to the packet processing thread associated with the bucket. In contrast, when the load balancing flag is set, the packets of the bucket are mapped to the load balancer 130 to be distributed over multiple packet processing threads 150. In some embodiments, the load balancing flags of the buckets 120 are cleared by-default. A load balancing flag is switched from a first state (i.e., a direct mapping state) to a second state (i.e., load balancing state) in response to the detection of an oversubscription of the packet processing thread associated with the bucket. The load balancing flag is further switched back from the second state (load balancing state) to the first state (direct mapping) in response to the detection that the packet processing thread is no longer oversubscribed. The periodic monitoring of the queue of the packet processing thread allows for dynamically setting the bucket in the appropriate mode such that forwarding of the packets is performed efficiently while avoiding load balancing flows when not needed. In some embodiments, the load balancing flag of the bucket is copied to the meta-headers for all packets mapped to the hash bucket. Thus, each packet contains an indication of whether it is being directly mapped to a packet processing thread along with all the packets of the same flow, or alternatively, if the packets of the flow are being load balanced across multiple packet processing threads.

In accordance with some embodiments, in order to determine the state of a packet processing thread, the performance monitor 140 measures the length of its associated queue at a given instant and determines whether the queue length is above a predetermined threshold. According to an alternative embodiment, in order to determine the state of a packet processing thread, the performance monitor 140 determines an Exponentially Weighted Moving Average (EWMA) Queue Length for its associated queue. The EWMA average queue length provides a measure of the average queue length over a determined period of time, which allows the performance monitor 140 to account for and ignore short bursts of packets in otherwise well-behaved flows. The performance monitor 140 determines whether the EWMA queue length is above a predetermined threshold to determine whether the corresponding queue is backlogged and the packet processing thread is oversubscribed.

In accordance with one embodiment, each flow of packets received at the network element is mapped to a distinct hash bucket (i.e., the number of hash buckets is equal to or greater than the number of flows received at the network element). Thus, the identification of the flow responsible for the irregular behavior and the oversubscription of a packet processing thread is performed by the identification of the bucket causing the oversubscription.

In one embodiment, flows mapped to the load balanced buckets, may get processed in various orders and may be output by the packet processing threads in an order different from their ingress order. Thus packets of the load balanced flows may need to be reordered prior to being output from the network element. In contrast, the flows mapped directly to an associated packet processing thread will be processed and output according to their ingress order and will not need to be re-ordered.

FIG. 6 illustrates detailed operations performed in the network element for reordering the packets. Following their processing in the packet processing threads 150, the packets are forwarded to the reordering block 160. The reordering block 160 performs re-sequencing of the packets according to their position with respect to other packets of the same flow at their receipt in the network element. At block 604, upon receipt of a packet of a flow, the reordering block 160 determines whether the packet has a load balancing flag set, indicating that the packet is part of a flow which was load balanced. When the load balancing flag is set, the reordering block determines, at block 606, whether at least one packet preceding the received packet is still to be processed, or has not yet completed its processing, by a packet processing thread. In other words, the reordering block 160 determines whether all packets preceding the received packet were forwarded or not. If all packets preceding the received packet were already processed and forwarded, the received packet is output, as illustrated at block 612. If at least one packet is still to be processed or has not yet completed its processing, the received packet is stored in a buffering area, at block 608, until all of its preceding packets are processed. The packets with load balancing flags set may be buffered to ensure that the packets exit the network element in the same order in which they entered. In some embodiments, the reordering is based on the sequence numbers assigned at block 502. For example, at ingress of the network element multiple packets are received and assigned a sequence number from 1-103. In this example, at least some of the packets are mapped to the packet processing thread according to a load balancing technique. For example, packet 103 is load balanced and its load balancing flag is set. Following processing the packet 103 in the packet processing thread, it is received at the reordering block 160. The reordering block 160 may have received and output packets with sequence numbers 1-100 but not the packets 101 and 102. Upon receipt of the packet 103, the reordering block 160 determines whether its load balancing flag is set (at block 604), and determines whether all its preceding packets have been processed (the packets 1 to 102). Upon determination that the packets 101 and 102 have not been processed yet, the packet 103 is stored in the buffering area (at block 608) until each of the packets with the sequence numbers 101 and 102 is received and output, or dropped and its sequence number is released.

Referring back to block 604, upon determination that the load balancing flag of the packet is not set or is cleared (i.e., the packet was directly mapped to an associated packet processing thread with all packets from the same flow, and the flow was not load balanced), the packet is forwarded, at block 612, without reordering. Alternatively, in some embodiments, prior to being output, a token with the same sequence number as the packet may be created and stored in the buffering area, at block 610, while the actual packet is output (at block 612). For example, a single pool of sequence numbers is used for multiple flows received at the network element. The flows may be received at the network element in an interleaved manner. A first subset of the flows (e.g., at least one flow of packets) is mapped to a first bucket and a second subset of the flows (e.g., at least one flow of packets) is mapped to a second bucket. The first bucket may be in a direct mapping mode while the second bucket is in a load balancing mode. According to this embodiment, some packets with sequence numbers from the pool may have been processed in sequence with respect to the other packets of the flow they belong to, while packets from the second subset may not be processed in sequence as they are load balanced over multiple packet processing threads. Consequently, packets from the first subset and the second subset may reach the reordering block in a random order with respect to each other, different from the order at which the packets (from the first subset and the second subset) entered the network element with respect to each other. However, in this example, the reordering module 160 uses the sequence numbers of the pool to reorder and output the packets according to their ingress order. Therefore, even if a packet is not load balanced, the reordering module 160 may still need to account for the sequence number of this packet while reordering the load-balanced packets. In this example, the token sequence number is used to account for the packet of the directly mapped flows. Even though the packets of the directly mapped flows are output, their tokens are stored in the buffering area (at block 610) to ensure that the packets of the load balanced flows from the same pool are output in the proper ingress order. In this particular example, the packets of the flows of the first bucket are output directly and a token may be stored in the buffering area for each one of them, while the packets of the second bucket are stored in the buffering area.

In some embodiments, when the packets are assigned sequence numbers, at block 502, from different pools of numbers, the pool ID is taken into consideration while reordering the packets in the reordering block 160. The pool ID copied in the meta-header of each packet is used during the reordering. The load balanced packets are reordered with respect to packets with the same pool ID.

The embodiments of the disclosed techniques provide an adaptive packet processing mechanism that aims to provide high performance packet processing by selecting between a direct flow mapping and load balancing mapping for each flow received at a network element depending on the state of the packet processing threads forwarding the packets. The embodiments of the disclosed techniques allow for a majority of the flows to be processed according to a direct mapping (flow—thread), avoiding the cost of reordering. The embodiments of the disclosed techniques further allow load balancing flows only when needed. Thus, the adaptive packet processing re-orders the packets only when needed.

Embodiments of the adaptive load balancing in packet processing, as described with reference to FIGS. 1-6 may be implemented in a Network Element (NE) as described in more details herein. In particular, embodiments of the disclosed techniques may be implemented in a forwarding virtual network function (Forwarding VNF) of a virtual network element (VNE).

SDN and NFV Environment Utilizing Embodiments of the Invention

Figure 7A:
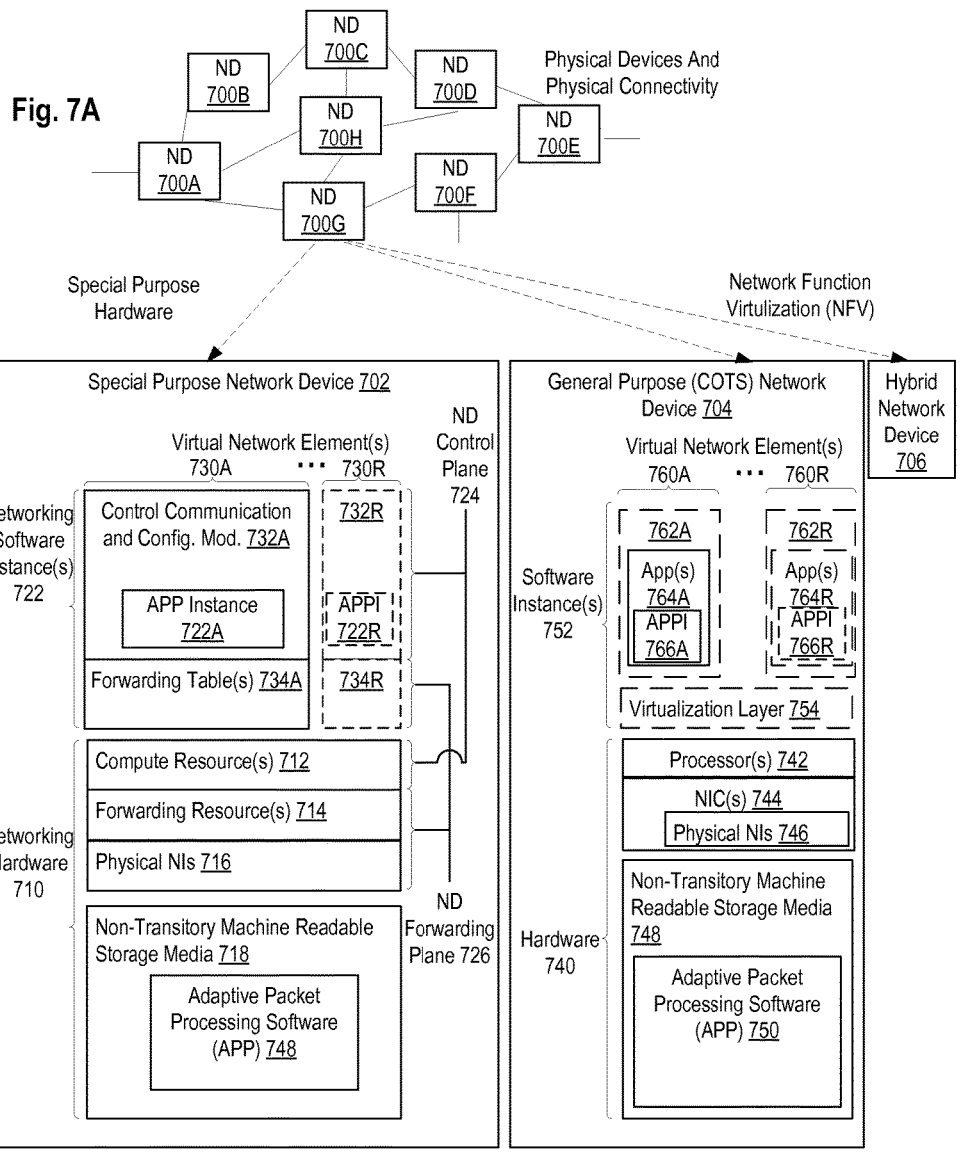
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R. The virtual network elements 730A-R may include instances 722A-722R of an adaptive packet processing software (APP) 748 implementing embodiments of the invention as described with reference to FIGS. 1-6. Each instance 722A is configured to process and forward packets received at the network device 702 by mapping a packet to a packet processing thread according to a direct mapping scheme or a load balancing scheme based on the state of the packet processing thread's queue.

Figure 7B:
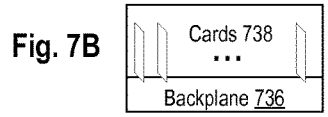
FIG. 7B illustrates an exemplary way to implement the special-purpose network device 702 according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used. The virtual network elements 760A-R may include instances 766A-766R of an adaptive packet processing software (APP) 750 implementing embodiments of the invention as described with reference to FIGS. 1-6. Each instance 766A is configured to process and forward packets received at the network device 704 by mapping a packet to a packet processing thread according to a direct mapping scheme or a load balancing scheme based on the state of the packet processing thread's queue.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). In some of these embodiments, the actual forwarding function (forwarding plane) is performed in a plurality of packet processing threads instantiated by each one of the APPI 733A-733R or APPI 766A-766R. The data received on the physical NRs is distributed to a packet processing thread based on one of the embodiments of the invention described with respect to FIGS. 1-6.

Figure 7C:
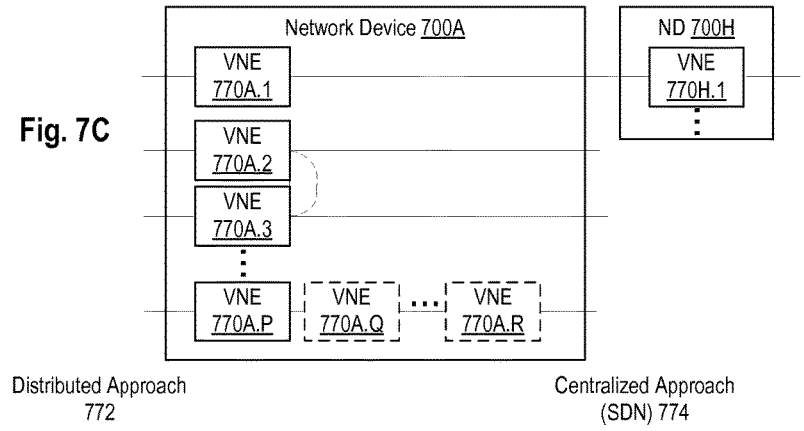
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e g, tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 7D:
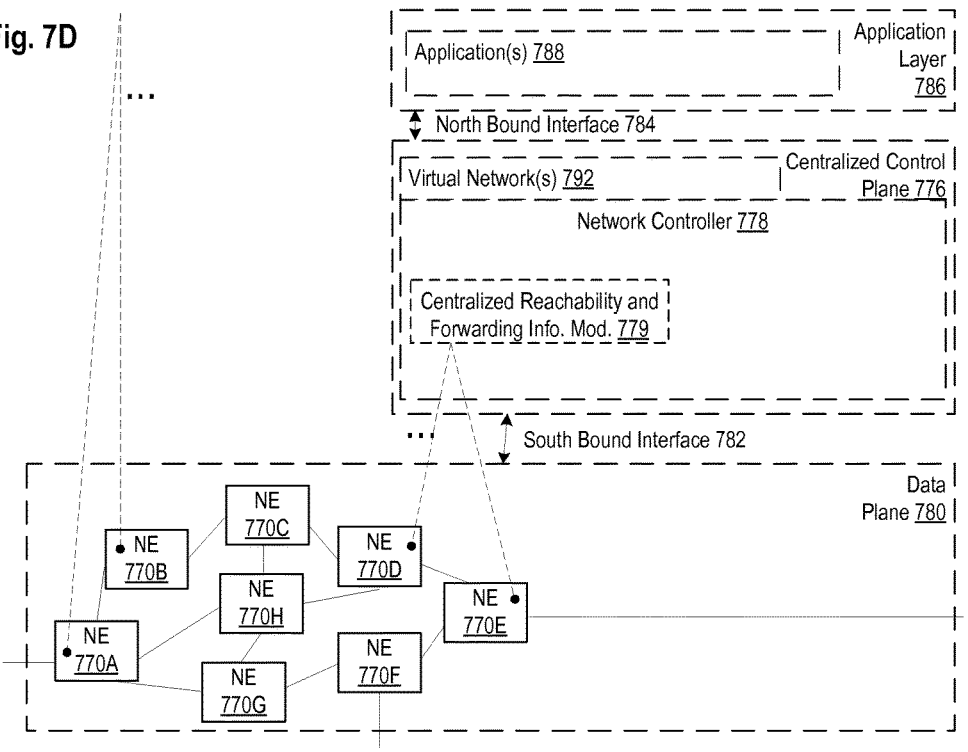
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches. In addition, the centralized approach 774 can be implemented with the special purpose network device 702 or the general purpose network device 704 implementing embodiments of the invention as described with reference to FIGS. 1-6 for enabling an adaptive load balancing in packet processing.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
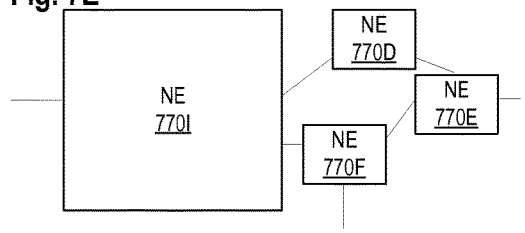
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7E:
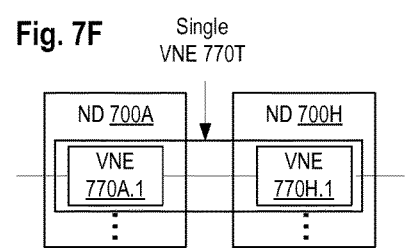

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Adaptive Load Balancing with Minimal Impact on Well-Behaved Flows

In the embodiments described above, flows received at the network device are subdivided into subsets (e.g., by being mapped to one of the multiple buckets), and a state is maintained for each bucket. The state is used to identify buckets containing heavy flows, and accordingly, these buckets are marked to be load balanced across all packet processing threads. The packets of the remaining buckets continue to be directly mapped to their corresponding packet processing thread.

These embodiments involve maintaining and monitoring a state at the bucket granularity, which helps in identifying and determining the heavy and/or hash skew flows. These states are maintained for all the flows (i.e., all the buckets) even if a small number of flows is responsible for the congestion (e.g., all flows mapped to a single bucket may be load balanced and reordered even if only a single flow from the mapped flows is responsible for the congestion). In general, mice flows (i.e., small flows as opposed to "elephant/heavy" flows) are expected to dominate flows, and it may not be desirable to pay the cost for maintaining additional monitoring states for all the flows since not all the flows will be contributing towards oversubscription of the packet processing threads.

The embodiments presented below allow a packet processing network element in a network device to re-sequence (reorder) processed packets only when needed and that for a small set of flows. The embodiments avoid adding any computation overhead at the flow or the bucket (i.e., subset of flows) level for all the flows received at the network element. In contrast to the embodiments discussed above, in the below embodiments, only a subset of flows is subject to state monitoring. The embodiments propose that the packet processing threads of the forwarding element (packet processing network element) be categorized between those participating in load-balancing forwarding and which may require re-sequencing for the processed packets, and those not participating in load-balancing and which may not require re-sequencing.

In some embodiments, the notion of packet processing thread pools (or thread categories) is introduced. According to some embodiments, all packet processing threads are in a "Normal" pool/category at the system's initialization stage. When a queue backlog is detected for any of the packet processing threads, the packet processing thread is moved into a "Backlogged" pool. In some embodiments, when a packet processing thread with a high backlog is moved to the Backlogged pool, at least one additional packet processing thread with a low backlog is additionally added to the pool. All packet traffic mapped to the packet processing threads in the Backlogged pool is load balanced across all the threads of the pool. Based on a monitoring mechanism, additional threads can be added to the Backlogged pool to assist in the load-balancing of packets mapped to the Backlogged pool of threads, or alternatively, packet processing threads can be withdrawn from the Backlogged pool. In some embodiments, there may be an additional packet processing thread pool to assist in the process of reverting the backlogged packet processing threads to the normal state (i.e., moving a thread from the Backlogged pool to the Normal pool). In this embodiment, the additional thread pool serves as a "Transition" (or intermediate) pool, to avoid frequent transitions of threads between the Backlogged pool and the Normal pool.

In some embodiments, the packets mapped to a packet processing thread from the Backlogged pool may need to get re-sequenced (reordered) in the staging area, while packets mapped to other packet processing threads (e.g., in the Normal pool) can get forwarded directly without being reordered.

Figure 8:
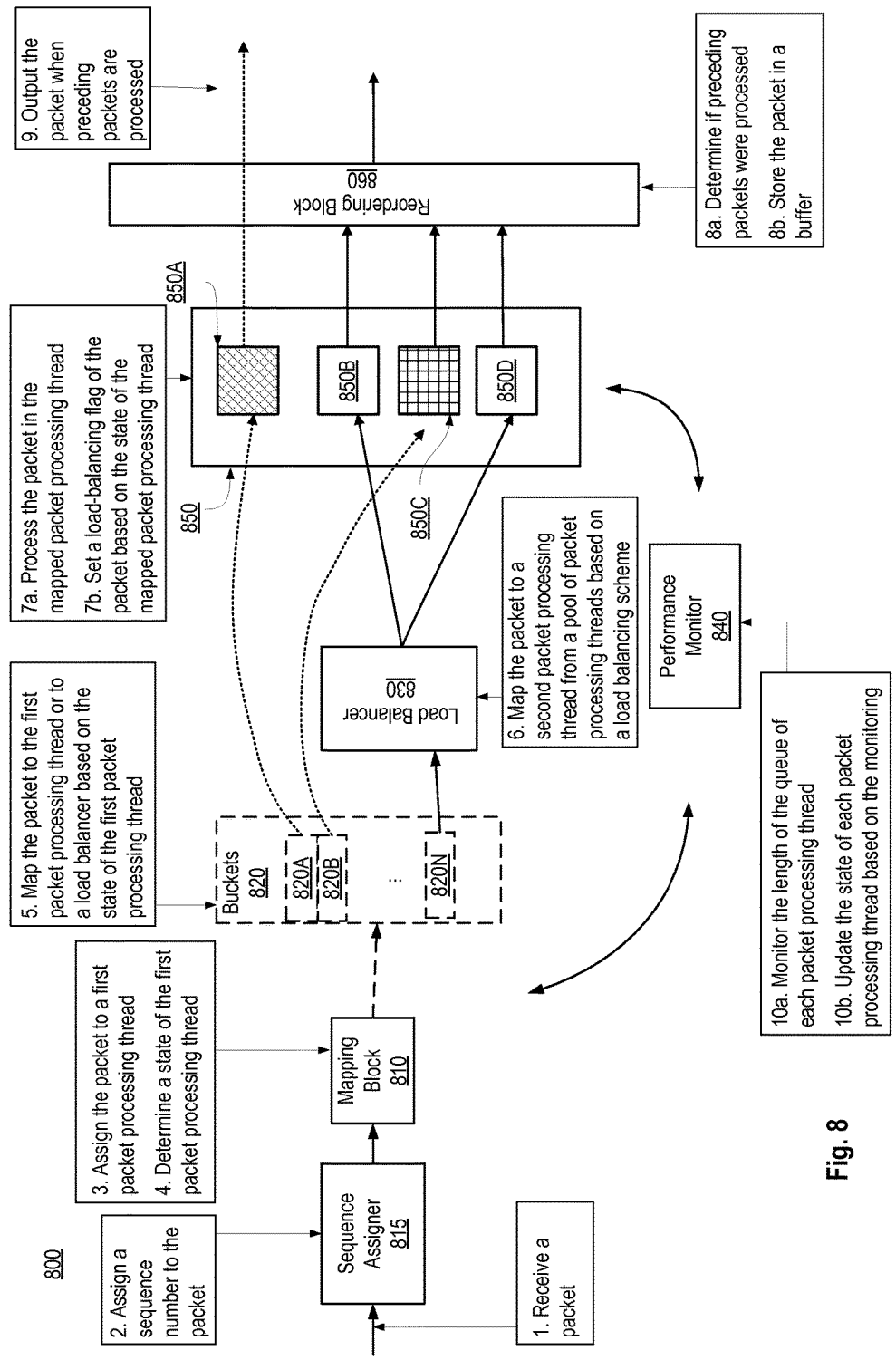
FIG. 8 illustrates operations in a network device for adaptive load balancing in packet processing with minimal impact on well-behaved flows according to some embodiments of the invention.

FIG. 8 illustrates operations in a network device for adaptive load balancing in packet processing with minimal impact on well-behaved (e.g., non-heavy, non-elephant) flows according to one embodiment of the invention. Task boxes 1 to 10b illustrate the order in which operations are performed according to one embodiment of the invention.

At task box 1, a packet is received at the network device. The packet is received through a network interface and forwarded to the sequence assigner 815. At task box 2, a sequence number is assigned to each incoming packet. The sequence number assigned is later used at the reordering block 860 to ensure that the packets exit the network device in the same order that they entered. According to one embodiment, the packets are assigned a sequence number on a flow basis, such that packets of the same flow are assigned different (e.g., successive) numbers of the same sequence. According to another embodiment, the packets are assigned a sequence number on an aggregate flow basis, such that packets of multiple flows are assigned different (e.g., successive) numbers of the same sequence (e.g., flows received at the same physical port, flows with the same protocol port, or all flows received at the network element, etc.). In some embodiments, prior to being assigned a sequence number, each packet may pass a validity check.

In an alternative embodiment, task box 2 is an optional operation and is skipped. In this embodiment, upon receipt of a packet in the network device, the packet is forwarded to the mapping block 810 without being assigned a sequence number. The packets may be reordered at the reordering block 860 to be output according to a determined order and based on information included within the packets (header fields of the packets). The order may be based on the position of the packet relative to positions of other packets at their receipt at the network device.

At task box 3, the mapping block 810 assigns the packet to a packet processing thread from the packet processing threads 850. In accordance with some embodiments, the mapping block 810 may be configured or adapted to perform header parsing and packet classification. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in a set of one or more forwarding tables best matches the packet based upon the match structure, or key, of the forwarding table entries. It is possible that many flows represented in the forwarding table entries can correspond/match to a packet; in this case, the system is typically configured to determine one forwarding table entry from the many according to a defined scheme (e.g., selecting a first forwarding table entry that is matched).

In an alternative embodiment, at task box 3, assigning the packet to a packet processing thread further includes mapping the packet to one of the buckets 820A-N prior to adding the packet to a queue of the assigned packet processing thread. The mapping may be performed according to a hashing mechanism. In one embodiment, each one of the buckets 820A-N is associated with one of the packet processing threads 850A-D. For example, upon receipt of a packet, the mapping block 810 may map the packet to the bucket 820A which is associated with the first packet processing thread 850A. In another example, upon receipt of the packet, the mapping block 810 may map the packet to the bucket 820N, which in turn is associated with another packet processing thread.

At task box 4, the mapping block 810 determines a state of the packet processing thread to which the packet is assigned. According to one embodiment, the state of the packet processing thread may be either a normal state or a backlogged state. In an alternative embodiment, the state of the packet processing thread may be either a normal state, a transition state, or a backlogged state. If the state of the packet processing thread is a backlogged state, this is an indication that this packet processing thread is part of the "Backlogged pool" of threads. The Backlogged pool is a set of packet processing threads used by the load balancer 830 to load balance flows of packets. When the state of the packet processing thread is a normal state, this is an indication that this packet processing thread is part of the "Normal pool" of threads. The Normal pool is a set of packet processing threads, which receive packets of flows directly mapped to the packet processing threads (without being load balanced). In the embodiments including a third state (transition state), if the packet processing thread has a transition state, this is an indication that the thread was recently part of the Backlogged pool of threads and is in the process of transitioning to the Normal pool of threads. The state of each packet processing thread is set and updated according to embodiments described below with reference to FIG. 8 (task boxes 10*a* and 10*b* performed in the performance monitor 840) and FIG. 11.

At task box 5, the packet is mapped to the first packet processing thread (to which the packet is assigned at task box 3) or, alternatively, to the load balancer 830 based on the state of the first packet processing thread. In a non-limiting example, a packet is assigned to the packet processing thread 850A (as described with reference to task box 3), and upon determination, at task box 4, that the state of the packet processing thread 850A is a normal state (i.e., the packet processing thread is part of the Normal pool of threads), the packet is directly mapped to the packet processing thread 850A for processing. In another non-limiting example, the packet is assigned to the packet processing thread 850B, and upon determination that the state of the packet processing thread 850B is a backlogged state (i.e., the thread is part of the Backlogged pool of threads), the packet is mapped to the load balancer 830 to be distributed through the set of threads (e.g., 850B and 850D) of the Backlogged pool. In this example, the load balancer 830, at task box 6, maps the packet to a second packet processing thread from the Backlogged pool based on a load balancing scheme (e.g., the second thread may be either the packet processing thread 850B or 850D). In some embodiments, a packet may alternatively be assigned to a transition thread (e.g., 850C) and upon determination that the state of the packet processing thread to which the packet is assigned is a transition state (i.e., the thread is part of the Transition pool), the packet is directly mapped to the assigned thread (i.e., 850C).

In some embodiments, the mapping of task box 5 is performed after the packet is mapped to one of the buckets 820. In an alternative embodiment, the mapping of task box 5 is performed by the mapping block 810 directly after determination of the state of the first packet processing thread (task box 4) without the packet being mapped to one of the buckets 820.

As described above, at task box 6, the load balancer 830 distributes (maps) packets to packet processing threads of the Backlogged pool. In some embodiments, the Backlogged pool includes a subset of the total number of packet processing threads running on the network device. This subset of threads is set up dynamically according to the traffic entering the network device. Threads may be added or removed from the Backlogged pool according to the flows received at the network device and according to the monitoring of the queues of the packet processing threads. The set of threads in a pool (e.g., the Backlogged pool, the Normal pool, or the Transition pool) is adapted according to the state of each thread, which is determined according to embodiments described with reference to FIG. 8 (task box 10*a* and task box 10*b*) and FIG. 11. Thus, the load balancer 830 adapts the mapping of the packets through the Backlogged pool according to the packet processing threads in the pool. In the illustrated example of FIG. 8, the packet processing threads 850B and 850D are part of the Backlogged pool, while the packet processing thread 850C is included in the Transition pool, and the packet processing thread 850A is included in the Normal pool. In the illustrated example, upon receipt of a packet, the load balancer 830 maps the packet to one of the packet processing threads 850B or 850D from the Backlogged pool based on a load balancing scheme. The load balancing of the packets may be performed, for example, according to a Round-Robin mechanism, a random distribution mechanism, or another distribution mechanism that may take additional factors into account (e.g., heuristics, current workloads, queue lengths at the packet processing threads, etc.).

Upon the mapping of the packet to one of the packet processing threads 850, (either through the load balancer 830 or directly mapped) based on the state of the packet processing thread, the packet is added to the queue of that packet processing thread.

At task box 7*a*, the packets are processed in the corresponding packet processing thread (e.g., one of the packet processing threads 850A-850D). Each packet processing thread retrieves packets from its corresponding queue to process the packets. In one embodiment, each packet processing thread runs on a different processor core. In an alternative embodiment, two or more threads may run on a single processor core. Each packet processing thread 850A-D processes a packet according to forwarding table(s) such that the packets are output to the appropriate physical network interfaces (NIs) or dropped. While four packet processing threads 850A-850D are illustrated in FIG. 8, alternative embodiments of the invention could have any number of packet processing threads (e.g., hundreds or thousands of packet processing threads may run in a network device). In particular, alternative embodiments may have different numbers of packet processing threads included in each pool. Each of the pools (Normal, Backlogged, and Transition) may include one or more packet processing threads, and the size of a pool may be adaptable according to the traffic received at the network device.

At task box 7*b*, a load balancing flag of the packet processed in a packet processing thread is set based on the state of the packet processing thread. In some embodiments, for each packet processed in a thread from the Backlogged pool, a flag (load balancing flag) indicating that the packet needs to be reordered is set. In some embodiments, the load balancing flag is set in the meta-headers for all packets processed in a packet processing thread from the Backlogged pool, while the load balancing flag is not set for all packets processing in a packet processing thread from the Normal pool. Thus, each packet indicates whether it is being directly mapped to a packet processing thread along with all the packets of the same flow, or alternatively, if the packets of the flow are being load balanced across multiple packet processing threads. In alternative embodiments, the load balancing flag is set for packets being processed in a packet processing thread from the Backlogged pool or the Transition pool, while the load balancing flag is not set when the packet is processed in a packet processing thread from the Normal pool.

In some embodiments, based on the state of the packet processing thread, the packet processed in the thread is sent to the reordering block 860 to be processed.

At task box 8a, upon receipt of a processed packet, the reordering block 860 determines whether the packets preceding the received packet were previously processed and forwarded prior to forwarding the received packet. The exit order of the packets is based on the sequence numbers assigned to the packets at the ingress of the network element. In some of these embodiments, the reordering block 860 may be skipped and the packets are output following their processing in the packet processing thread without being reordered. In other embodiments, when packets of a flow are distributed over multiple packet processing threads, they are no longer processed according to the sequence numbers assigned at task 2. In this example, the packets may be output from the packet processing threads in a different order than the ingress order. The packets are reordered prior to being forwarded to ensure that they are output from the network element according to the order assigned at ingress. In some embodiments, for each egressing packet, the reordering mechanism takes into account the pool of the thread which processed the packet and either performs a trivial re-sequence operation (for packets processed in a packet processing thread from the Normal pool), or performs a full re-sequencing, which includes the buffering of packets in the staging area (for packets processed in a packet processing thread from the Backlogged pool or the Transition pool) (i.e., storing of task box 8b). At task box 9, the packets are output in the ingress order.

Monitoring and Update of the State of a Packet Processing Thread

Figure 11:
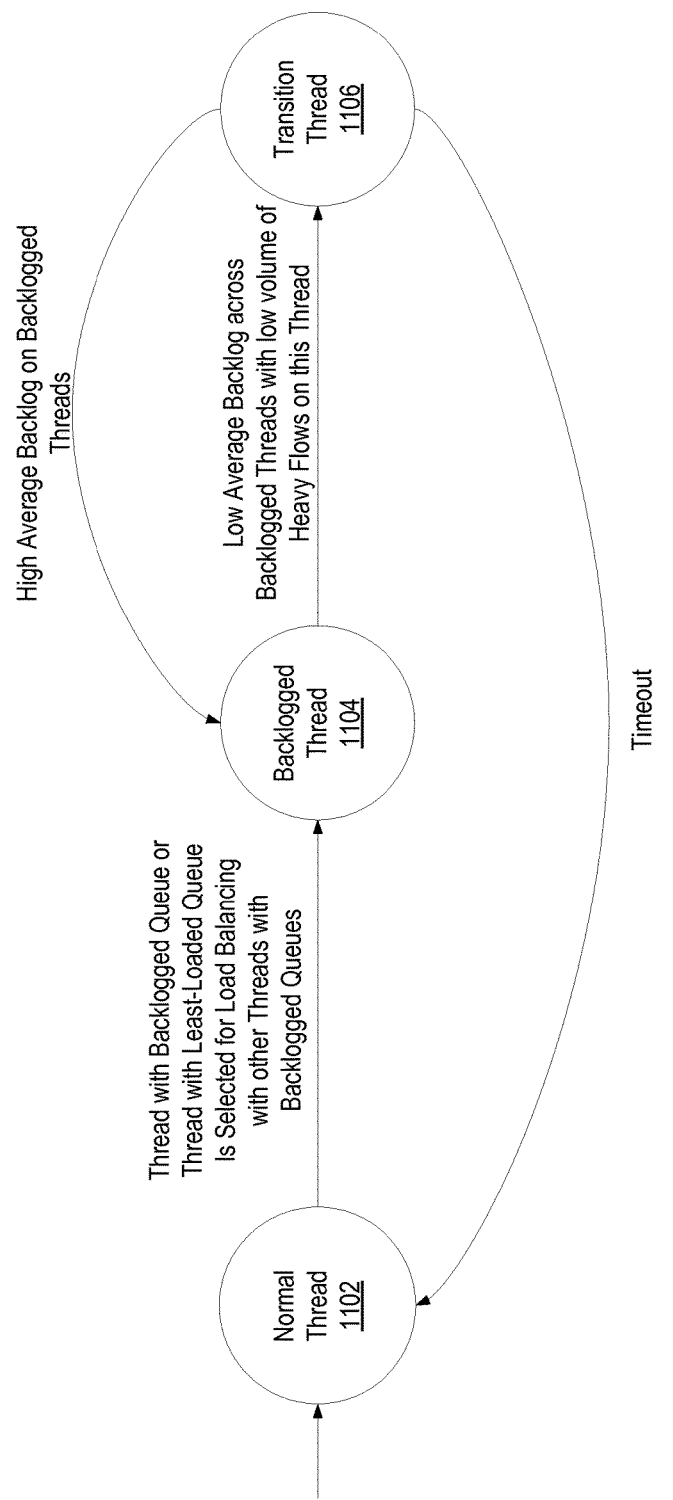
FIG. 11 illustrates a block diagram of the update of the state of a packet processing thread according to some embodiments of the invention.

FIG. 11 illustrates a block diagram of the update of the state of a packet processing thread according to some embodiments of the invention. On system initialization, all packet processing threads are in a normal state (1102) and belong to the Normal pool. None of the packet processing threads are backlogged and, accordingly, all of them will be processing and forwarding direct-mapped packets. At task box 10a of FIG. 8, the performance monitor 840 monitors the length of the queue of each one of the packet processing threads and, at task box 10b of FIG. 8, the performance monitor 840 updates the state of each packet processing thread based on the monitoring. In other words, the state of each one of the packet processing threads running in the network device is monitored and updated according to traffic received and processed in the network device.

In some embodiments, at task box 10a, the performance monitor 840 tracks the state of each queue and determines whether the queue is backlogged. When the queue of a packet processing thread is found to be oversubscribed (e.g., the Exponentially Weighted Moving Average (EWMA) Queue Length of the queue is above a threshold value), the state of the thread is set to be a "backlogged state," and the packet processing thread is considered to be part of the Backlogged pool of threads. Referring to FIG. 11, the state of the thread is updated from "normal thread 1102" to "backlogged thread 1104."

In some embodiments, when the Backlogged pool of packet processing threads includes a single packet processing thread, another packet processing thread may be added to the pool in order to enable load balancing of the packets over the set of threads of the Backlogged pool. In one embodiment, the additional packet processing thread added to the Backlogged pool may be chosen according to the length of its queue. In one non-limiting example, a packet processing thread with the shortest EWMA queue length (e.g., the thread with the least-loaded queue) is added to the Backlogged pool (i.e., the state of this thread is also set to "backlogged"). All packets mapped to any one of the "backlogged" packet processing threads are load-balanced by the load-balancer 830 to all the threads in the Backlogged pool. This effectively increases the compute resources available to handle packet flows assigned to over-subscribed threads.

In some embodiments, the EWMA queue lengths of all "backlogged" threads in the Backlogged pool are also monitored. In case the EWMA queue length of the majority of the threads in the pool (e.g., more than 80% of the threads) is above a threshold, another non-backlogged thread (e.g., a packet processing thread with the shortest EWMA queue length in its pool) is marked as "backlogged" and added to the Backlogged pool. In some embodiments, the Transition pool is first used to select a packet processing thread to add to the Backlogged pool of threads, then the Normal pool is checked.

The state of a packet processing thread may additionally be updated from a "backlogged thread 1104" to a "transition thread 1106" when the oversubscription of its associated queue appears to be slowing down.

In some embodiments, a packet processing thread is marked as a "transition thread 1106" (i.e., its state is a transition state) when the thread is being withdrawn from the Backlogged pool and will no longer participate in the load balancing of packets across the Backlogged pool.

In some embodiments, the transition packet processing thread is similar to a "backlogged" thread such that the reordering block 860 buffers the packets processed by a transition thread in the staging area in order to ensure output of the packets in the proper order. The transition state provides a transition period for moving a packet processing thread from the Backlogged pool to the Normal pool. A packet processing thread being withdrawn from the Backlogged pool may still have load-balanced packets in its queue, which need to be re-ordered via the reordering block 860 and thus the thread cannot be moved to the Normal pool immediately. All packets processed by the transition thread are marked with a load balancing flag. The load balancing flag is an indication to the reordering block 860 that these packets need to be stored in the staging area to be reordered before being output.

In some embodiments, in order to transition a thread from being a "backlogged thread 1104" to a "transition thread 1106," the performance monitor 840 may determine that the removal of a thread from the Backlogged pool of threads will not lead to an immediate heavy load on other threads in the Backlogged pool, which could lead to undesired oscillations, as the Backlogged pool may again need to be expanded by the addition of more non-backlogged threads.

In some embodiments, the transition of a thread from backlogged state to transition state is performed according to the mechanism described below. The average EWMA backlog across all backlogged threads is monitored. A bloom filter or EWMA, for example, can be used to detect heavy flows from among those flows mapped to the backlogged packet processing threads. The change in volume and number of heavy flows may be taken into account to determine when to transition a thread from the Backlogged pool to the Transition pool. In a non-limiting example, if there is a very heavy flow mapped to a backlogged thread, it may not be safe to transition that specific thread to the Transition pool, as there will be a high probability of that thread again getting backlogged and then needing to transition back to the Backlogged pool.

In some embodiments, a timer is started after transitioning the state of a packet processing thread from the "backlogged thread 1104" to the "transition thread 1106." On timeout, the state of the thread is changed to the "normal thread 1102."

Even though the tasks of the task boxes 1-10b of FIG. 8 are described in a sequential order, some tasks may be performed concurrently or in a different order than described above. For example, monitoring the state of the queues may be performed periodically and simultaneously to the mapping of the packets to a packet processing thread (either directly—taskbox 4, or indirectly—task box 5). In other embodiments, additional or fewer tasks may be performed.

The operations of the network device implementing adaptive load balancing in packet processing with minimal impact on well-behaved flows will be described with reference to the flow diagrams of FIG. 9 and FIGS. 10A-C. However, it should be understood that the packet processing module 800 can perform operations other than those discussed with reference to the flow diagrams of FIG. 9 and FIGS. 10A-C, and the embodiments discussed with reference to the flow diagrams of FIG. 9 and FIGS. 10A-C can be performed by embodiments of the invention other than those discussed with reference to FIG. 8.

Figure 9:
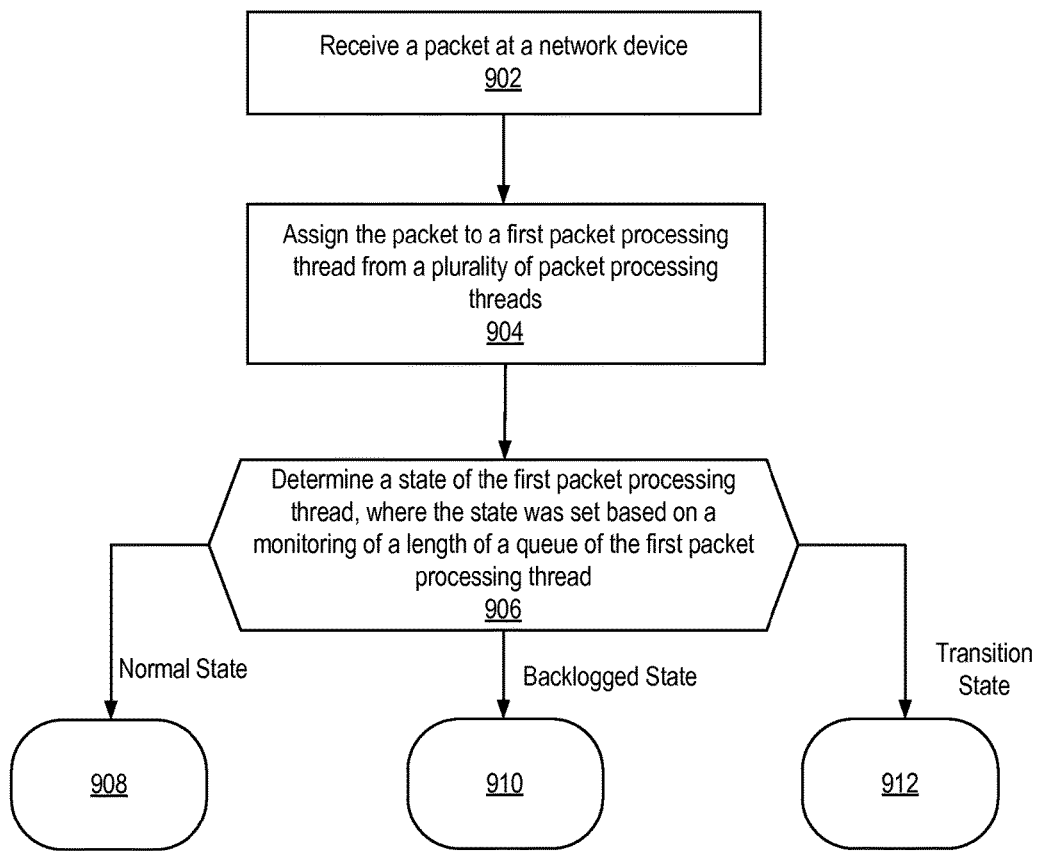
FIG. 9 illustrates a flow diagram of detailed operations performed in a network device of adaptive packet processing with minimal impact on well-behaved flows according to some embodiments of the invention.

FIG. 9 illustrates a flow diagram of operations for adaptive packet processing with minimal impact on well-behaved flows in a network device in accordance with one embodiment. At block 902, a packet is received at the network element. The packet is received through a network interface and may be forwarded to the sequence assigner 815. At block 904, the mapping block 810 assigns the packet to a packet processing thread from the packet processing threads 850. In accordance with some embodiments, the mapping block 810 may be configured or adapted to perform header parsing and packet classification (as described above).

In an alternative embodiment, assigning the packet to a packet processing thread, at block 904, further includes mapping the packet to one of the buckets 820A-N prior to adding the packet to the queue of its corresponding packet processing thread. The mapping may be performed according to a hashing mechanism. In one embodiment, each one of the buckets 820A-N is associated with one of the packet processing threads 850A-D. For example, upon receipt of a packet, the mapping block 810 may map the packet to the bucket 820A which is associated with the first packet processing thread 850A. In another example, upon receipt of the packet, the mapping block 810 may map the packet to the bucket 820N, which in turn is associated with another packet processing thread.

At block 906, the mapping block 810 determines a state of the packet processing thread to which the packet is assigned. According to one embodiment, the state of the packet processing thread may be either a normal state or a backlogged state. In an alternative embodiment, the state of the packet processing thread may be either a normal state, a transition state, or a backlogged state. If the state of the packet processing thread is a backlogged state, this is an indication that this packet processing thread is part of the "Backlogged pool" of threads. The Backlogged pool is a set of packet processing threads used by the load balancer 830 to load balance flows of packets. When the state of the packet processing thread is a normal state, this is an indication that this packet processing thread is part of the "Normal pool" of threads. The Normal pool is a set of packet processing threads, which receive packets of flows directly mapped to the packet processing threads (without being load balanced). In the embodiments including a third state (transition state), if the packet processing thread has a transition state, this is an indication that the thread was recently part of the Backlogged pool of threads and is transitioning into the Normal pool of threads. The state of each packet processing thread is set and updated according to embodiments described above with reference to FIG. 8 (task boxes 10a and 10b performed in the performance monitor 840) and FIG. 11.

The packet is mapped to the first packet processing thread (to which the packet is assigned at block 904) or, alternatively, to the load balancer 830 based on the state of the first packet processing thread. If the state is determined to be a normal state, flow moves to block 908. If the state is determined to be a backlogged state, flow moves to block 910. If the state is determined to be a transition state, flow moves to block 912.

Figures 10A, 10B, 10C:
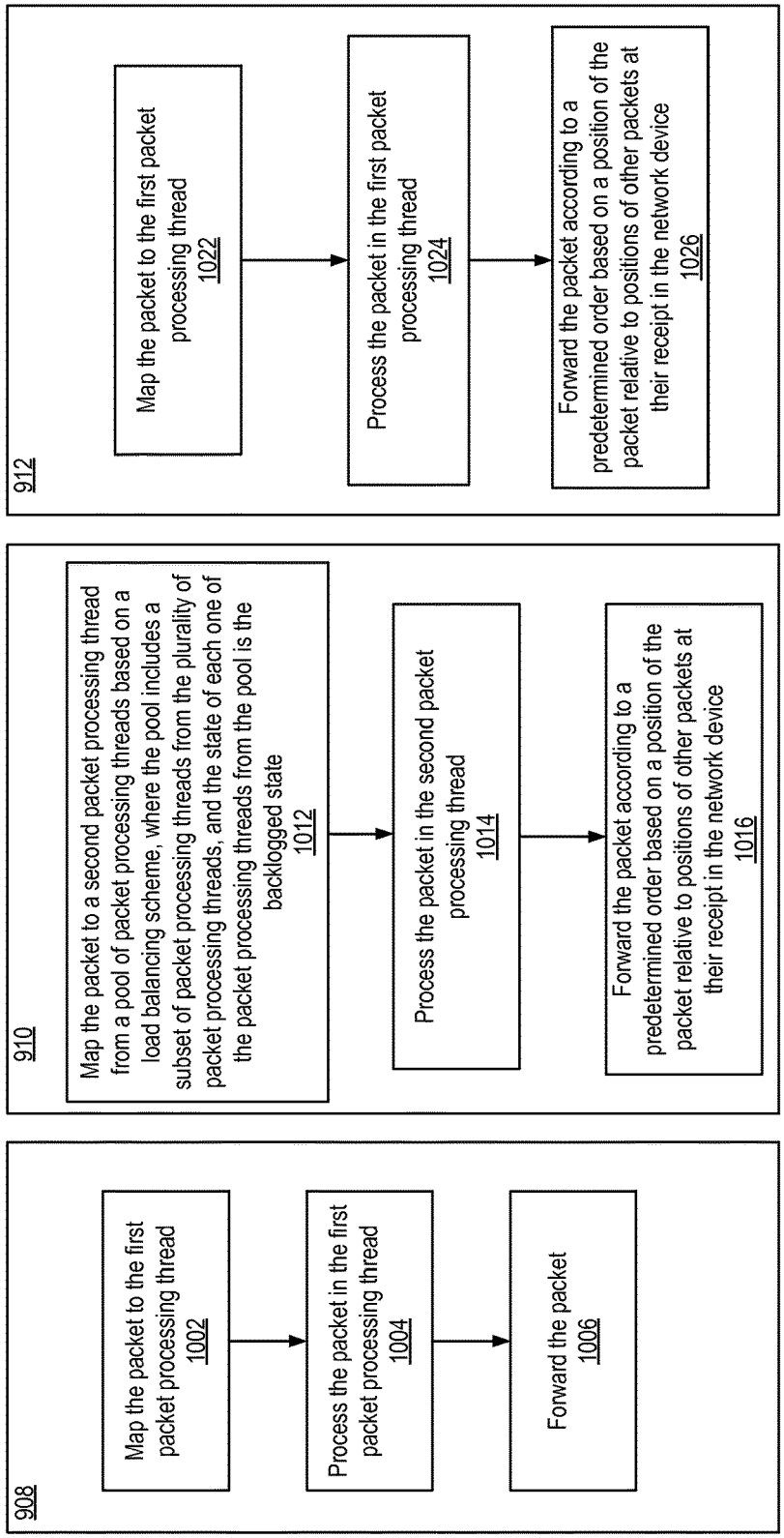
FIG. 10A illustrates a flow diagram of detailed operations performed in a network device of mapping a packet to a packet processing thread when the state of the packet processing thread is a normal state according to some embodiments of the invention.
FIG. 10B illustrates a flow diagram of detailed operations performed in a network device of mapping a packet to a packet processing thread when the state of the packet processing thread is a backlogged state according to some embodiments of the invention.
FIG. 10C illustrates a flow diagram of detailed operations performed in a network device of mapping a packet to a packet processing thread when the state of the packet processing thread is a transition state according to some embodiments of the invention.

FIGS. 10A-C illustrate flow diagrams of detailed operations performed in a network device of mapping a packet to a packet processing thread based on the state of the packet processing thread according to some embodiments of the invention. In a non-limiting example, a packet is assigned to the packet processing thread 850A of FIG. 8 (as described with reference to block 904), and upon determination that the state of the packet processing thread 850A is a normal state (i.e., the packet processing thread is part of the Normal pool of threads), the packet is directly mapped, at block 1002, to the packet processing thread 850A for processing. In another non-limiting example, the packet is assigned to the packet processing thread 850B of FIG. 8, and upon determination that the state of the packet processing thread 850B is a backlogged state (i.e., the thread is part of the Backlogged pool of threads), the packet is mapped, at block 1012, to a second packet processing thread from a pool of packet processing threads based on a load balancing scheme. In this example, the Backlogged pool includes a subset of the packet processing threads of the network device, and the state of each one of the packet processing threads from the pool is the backlogged state (e.g., the packet is mapped to the load balancer 830 of FIG. 8, at block 1012, to be distributed to one of the set of "backlogged" threads, e.g., 850B and 850D of FIG. 8). In some embodiments, a packet may alternatively be mapped, at block 1022, to a transition thread (e.g., 850C of FIG. 8), and upon determination that the state of the packet processing thread to which the packet is assigned is a transition state (i.e., the thread is part of the Transition pool), the packet is directly mapped, at block 1022, to the packet processing thread 850C for processing.

Upon the mapping of the packet to one of the packet processing threads 850, (either through the load balancer 830 or directly mapped) based on the state of the packet processing thread, the packet is added to the queue of that packet processing thread.

At blocks 1004, 1014, and 1024, the packet is processed in the packet processing thread (e.g., one of the packet processing threads 850A-850D) to which the packet is mapped. Each packet processing thread retrieves packets from its corresponding queue to process the packets. In one embodiment, each packet processing thread runs on a different processor core. In an alternative embodiment, two or more threads may run on a single processor core. Each packet processing thread 850A-D processes a packet according to forwarding table(s) such that the packets are output to the appropriate physical network interfaces (NIs) or dropped. While four packet processing threads 850A-850D are illustrated in FIG. 8, alternative embodiments of the invention could have any number of packet processing threads (e.g., hundreds or thousands of packet processing threads may run in a network device).

Although not illustrated in FIGS. 10A-C, in some embodiments, a load balancing flag of the packet processed in a packet processing thread is set based on the state of the packet processing thread when the packet is processed. In some embodiments, for each packet processed in a backlogged thread (a thread from the Backlogged pool), a flag (load balancing flag) indicating that the packet needs to be reordered is set. In some embodiments, the load balancing flag is set in the meta-headers for all packets processed in a "backlogged" packet processing thread, while the load balancing flag is not set for all packets processed in a normal packet processing thread. Thus, each packet indicates whether it is being directly mapped to a packet processing thread along with all the packets of the same flow, or alternatively, if the packets of the flow are being load balanced across multiple packet processing threads. In alternative embodiments, the load balancing flag is set for packets being processed in a "backlogged" packet processing thread and for packets being processed in a transition packet processing thread, while the load balancing flag is not set for packets being processed in a normal packet processing thread.

In some embodiments, the packet is then sent to the reordering block 860, and the packet is processed based on the state of the packet processing thread.

At blocks 1006, 1016 and 1026, in some embodiments, upon receipt of a processed packet, the reordering block 860 determines whether the packets preceding the received packet were previously processed and forwarded prior to forwarding the received packet. The exit order of the packets is based on the sequence numbers assigned to the packets at the ingress of the network element. In some of these embodiments, the reordering block 860 may be skipped, and the packets are output following their processing in the packet processing thread without being reordered. In other embodiments, when packets of a flow are distributed over multiple packet processing threads, the packets are no longer processed according to the sequence numbers assigned. In this example, the packets may be output from the packet processing threads in a different order than the ingress order. The packets are reordered prior to being forwarded to ensure that they are output from the network element according to the order assigned at ingress.

In some embodiments, the reordering of the packets processed in the packet processing threads is performed according to the operations described above with reference to FIG. 6. In these embodiments, according to the load balancing flag set for each packet, the packet is stored in the staging area or not before being forwarded in order to ensure output of the packets in the order they were received at the network element. The packets processed in the "backlogged" or transition threads are stored in the staging area and are reordered by the reordering block 860. The packets processed in the normal threads are output without being reordered.

The embodiments of the disclosed techniques provide an adaptive packet processing mechanism that aims to provide high performance packet processing by selecting between a direct flow mapping and load balancing mapping for each flow received at a network element based on the state of the packet processing threads forwarding the packets. The embodiments of the disclosed techniques allow for a majority of the flows to be processed according to a direct mapping (flow—thread), avoiding the cost of reordering for that portion of the flows. The embodiments of the disclosed techniques further allow load balancing flows only when needed. Thus, the adaptive packet processing re-orders the packets only when needed.

Embodiments of the adaptive load balancing in packet processing, as described with reference to FIGS. 8-11 may be implemented in a Network Element (NE) as described in more details herein. In particular, embodiments of the disclosed techniques may be implemented in a forwarding virtual network function (Forwarding VNF) of a virtual network element (VNE).

SDN and NFV Environment Utilizing Embodiments of the Invention

Figure 12:
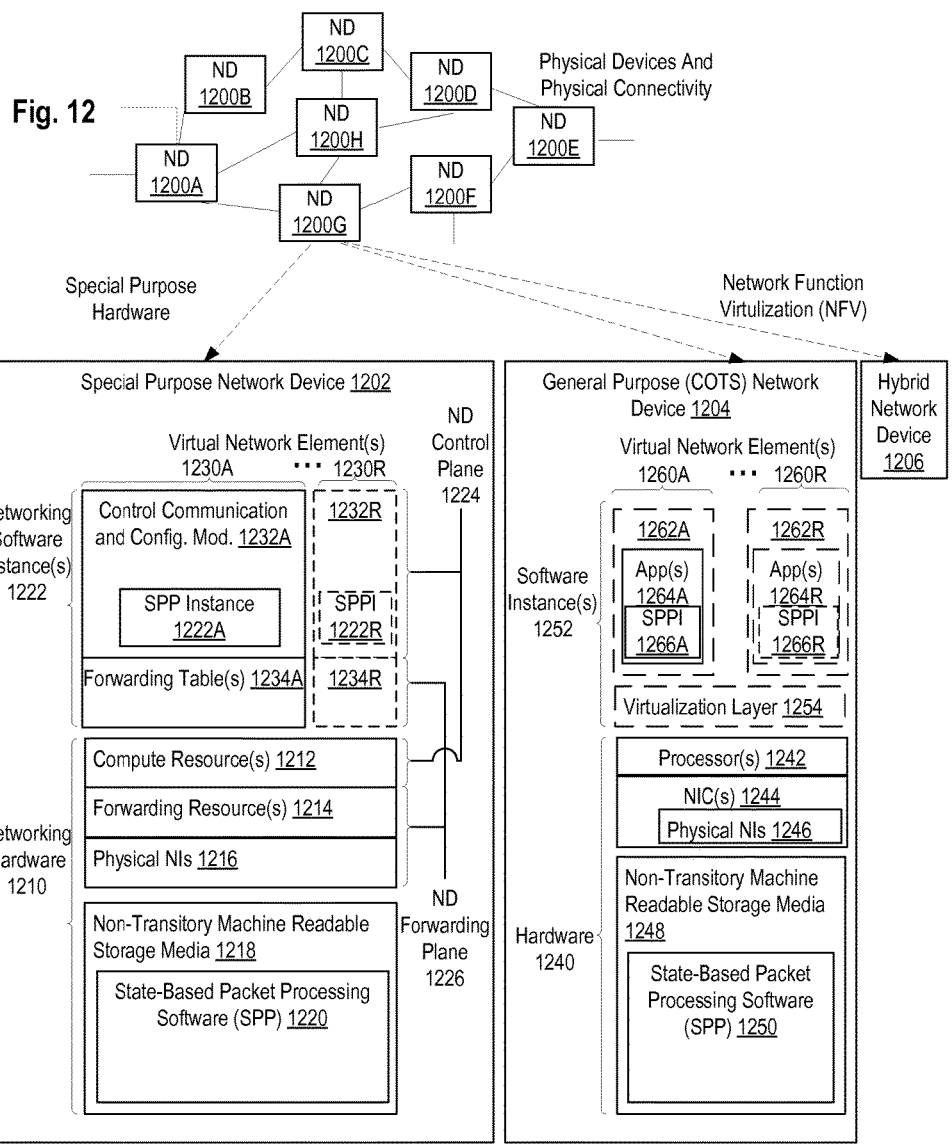
FIG. 12 illustrates connectivity between network devices (NDs) within an exemplary network, as well as three exemplary implementations of the NDs, according to some embodiments of the invention.

FIG. 12 illustrates connectivity between network devices (NDs) within an exemplary network, as well as three exemplary implementations of the NDs, according to some embodiments of the invention. FIG. 12 shows NDs 1200A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1200A, E, and F illustrates that these NDs act as ingress and egress points for the network (and thus, these NDs are sometimes referred to as edge NDs; while the other NDs may be called core NDs).

Two of the exemplary ND implementations in FIG. 12 are: 1) a special-purpose network device 1202 that uses custom application-specific integrated-circuits (ASICs) and a proprietary operating system (OS); and 2) a general purpose network device 1204 that uses common off-the-shelf (COTS) processors and a standard OS.

The special-purpose network device 1202 includes networking hardware 1210 comprising compute resource(s) 1212 (which typically include a set of one or more processors), forwarding resource(s) 1214 (which typically include one or more ASICs and/or network processors), and physical network interfaces (NIs) 1216 (sometimes called physical ports), as well as non-transitory machine readable storage media 1218 having stored therein networking software. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1200A-H. During operation, the networking software may be executed by the networking hardware 1210 to instantiate a set of one or more networking software instance(s) 1222. Each of the networking software instance(s) 1222, and that part of the networking hardware 1210 that executes that network software instance (be it hardware dedicated to that networking software instance and/or time slices of hardware temporally shared by that networking software instance with others of the networking software instance(s) 1222), form a separate virtual network element 1230A-R. Each of the virtual network element(s) (VNEs) 1230A-R includes a control communication and configuration module 1232A-R (sometimes referred to as a local control module or control communication module) and forwarding table(s) 1234A-R, such that a given virtual network element (e.g., 1230A) includes the control communication and configuration module (e.g., 1232A), a set of one or more forwarding table(s) (e.g., 1234A), and that portion of the networking hardware 1210 that executes the virtual network element (e.g., 1230A).

The special-purpose network device 1202 is often physically and/or logically considered to include: 1) a ND control plane 1224 (sometimes referred to as a control plane)

comprising the compute resource(s) 1212 that execute the control communication and configuration module(s) 1232A-R; and 2) a ND forwarding plane 1226 (sometimes referred to as a forwarding plane, a data plane, or a media plane) comprising the forwarding resource(s) 1214 that utilize the forwarding table(s) 1234A-R and the physical NIs 1216. By way of example, where the ND is a router (or is implementing routing functionality), the ND control plane 1224 (the compute resource(s) 1212 executing the control communication and configuration module(s) 1232A-R) is typically responsible for participating in controlling how data (e.g., packets) is to be routed (e.g., the next hop for the data and the outgoing physical NI for that data) and storing that routing information in the forwarding table(s) 1234A-R, and the ND forwarding plane 1226 is responsible for receiving that data on the physical NIs 1216 and forwarding that data out the appropriate ones of the physical NIs 1216 based on the forwarding table(s) 1234A-R. The virtual network elements 1230A-R may include instances 1222A-1222R of a state-based packet processing software (SPP) 1220 implementing embodiments of the invention as described with reference to FIGS. 8-10C. Each instance 1222A is configured to process and forward packets received at the network device 1202 by mapping a packet to a packet processing thread according to a direct mapping scheme or a load balancing scheme based on the state of the packet processing thread assigned to the packet.

The general purpose network device 1204 includes hardware 240 comprising a set of one or more processor(s) 242 (which are often COTS processors) and network interface controller(s) 1244 (NICs; also known as network interface cards) (which include physical NIs 1246), as well as non-transitory machine readable storage media 1248 having stored therein software 1250. During operation, the processor(s) 1242 execute the software 1250 to instantiate a hypervisor 1254 (sometimes referred to as a virtual machine monitor (VMM)) and one or more virtual machines 1262A-R that are run by the hypervisor 1254, which are collectively referred to as software instance(s) 1252. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1262A-R, and that part of the hardware 1240 that executes that virtual machine (be it hardware dedicated to that virtual machine and/or time slices of hardware temporally shared by that virtual machine with others of the virtual machine(s) 1262A-R), forms a separate virtual network element(s) 1260A-R.

The virtual network element(s) 1260A-R perform similar functionality to the virtual network element(s) 1230A-R. For instance, the hypervisor 1254 may present a virtual operating platform that appears like networking hardware 1210 to virtual machine 1262A, and the virtual machine 1262A may be used to implement functionality similar to the control communication and configuration module(s) 1232A and forwarding table(s) 1234A (this virtualization of the hardware 1240 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 1262A-R differently. For example, while embodiments of the invention are illustrated with each virtual machine 1262A-R corresponding to one VNE 1260A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used. The virtual network elements 1260A-R may include instances 1266A-1266R of a state-based packet processing software (SPP) 1250 implementing embodiments of the invention as described with reference to FIGS. 8-10C. Each instance 1266A is configured to process and forward packets received at the network device 1204 by mapping a packet to a packet processing thread according to a direct mapping scheme or a load balancing scheme based on a state of the packet processing thread assigned to the packet.

In certain embodiments, the hypervisor 1254 includes a virtual switch that provides similar forwarding services as a physical Ethernet switch. Specifically, this virtual switch forwards traffic between virtual machines and the NIC(s) 1244, as well as optionally between the virtual machines 1262A-R; in addition, this virtual switch may enforce network isolation between the VNEs 1260A-R that by policy are not permitted to communicate with each other (e.g., by honoring virtual local area networks (VLANs)).

The third exemplary ND implementation in FIG. 12 is a hybrid network device 1206, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1202) could provide for para-virtualization to the networking hardware present in the hybrid network device 1206.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

What is claimed is:

1. A method of forwarding packets in a network device, the method comprising:
   receiving a packet at the network device, wherein the network device includes a plurality of packet processing threads;
   assigning the packet to a first packet processing thread from the plurality of packet processing threads prior to adding the packet to a queue of the first packet processing thread, wherein each one of the plurality packet processing threads belongs to one of at least a normal pool of packet processing threads and a backlogged pool of packet processing threads;
   determining a state of the first packet processing thread, wherein the state was set based on a monitoring of a length of the queue of the first packet processing thread, and wherein the state is determined to be one of a plurality of states including a backlogged state and a normal state and the state indicates which pool of packet processing threads the first packet processing thread belongs to;

responsive to determining that the state of the first packet processing thread is a normal state, performing the following:
adding, at the network device, the packet to the queue of the first packet processing thread, processing the packet in the first packet processing thread, and forwarding the packet; and responsive to determining that the state of the first packet processing thread is a backlogged state, performing the following:
adding, at the network device, the packet to a queue of a second packet processing thread that is part of the backlogged pool of packet processing threads based on a load balancing scheme, wherein the backlogged pool of packet processing threads includes the first packet processing thread and a subset of packet processing threads from the plurality of packet processing threads, and the state of each one of the packet processing threads from the backlogged pool is the backlogged state,
processing the packet in the second packet processing thread, and
forwarding the packet according to a predetermined order, wherein the predetermined order is based on a position of the packet relative to positions of other packets at receipt of the packet and the other packets in the network device.

2. The method of claim 1, wherein the plurality of states additionally includes a transition state.

3. The method of claim 2, the method further comprising:
responsive to determining that the state of the first packet processing thread is the transition state, performing the following:
adding the packet to the queue of the first packet processing thread,
processing the packet in the first packet processing thread, and
forwarding the packet according to the predetermined order.

4. The method of claim 1, wherein the packet is received after receipt of a preceding packet at the network device and wherein forwarding the packet according to the predetermined order further includes:
determining whether the preceding packet is still to be processed by one of the plurality of packet processing threads;
responsive to determining that the preceding packet is still to be processed, storing the packet in a buffer; and
outputting the packet following processing and outputting of the preceding packet.

5. The method of claim 4, wherein forwarding the packet according to the predetermined order further includes:
determining that the packet has a load balancing flag set prior to storing the packet in the buffer.

6. The method of claim 1, further comprising:
assigning a unique sequence number to the packet, and wherein forwarding the packet is performed according to the unique sequence number.

7. The method of claim 1, wherein the length of the queue of the first packet processing thread is monitored in part by measuring an exponentially weighted moving average (EWMA) of the length of the queue of the first packet processing thread and comparing a measurement with a threshold.

8. A non-transitory machine-readable storage medium that provides instructions, which when executed by a processor of a network device, cause said processor to perform operations comprising:
receiving a packet at the network device, wherein the network device includes a plurality of packet processing threads;
assigning the packet to a first packet processing thread from the plurality of packet processing threads prior to adding the packet to a queue of the first packet processing thread, wherein each one of the plurality packet processing threads belongs to one of at least a normal pool of packet processing threads and a backlogged pool of packet processing threads;
determining a state of the first packet processing thread, wherein the state was set based on a monitoring of a length of the queue of the first packet processing thread, and wherein the state is determined to be one of a plurality of states including a backlogged state and a normal state and the state indicates which pool of packet processing threads the first packet processing thread belongs to;
responsive to determining that the state of the first packet processing thread is a normal state, performing the following:
adding, at the network device, the packet to the queue of the first packet processing thread,
processing the packet in the first packet processing thread, and
causing the packet to be forwarded; and
responsive to determining that the state of the first packet processing thread is a backlogged state, performing the following:
adding, at the network device, the packet to a queue of a second packet processing thread that is part of the backlogged pool of packet processing threads based on a load balancing scheme, wherein the backlogged pool of packet processing threads includes the first packet processing thread and a subset of packet processing threads from the plurality of packet processing threads, and the state of each one of the packet processing threads from the backlogged pool is the backlogged state,
processing the packet in the second packet processing thread, and
causing the packet to be forwarded according to a predetermined order, wherein the predetermined order is based on a position of the packet relative to positions of other packets at receipt of the packet and the other packets in the network device.

9. The non-transitory machine-readable storage medium of claim 8, wherein the plurality of states additionally includes a transition state.

10. The non-transitory machine-readable storage medium of claim 9, wherein the operations further comprise:
responsive to determining that the state of the first packet processing thread is the transition state, performing the following:
adding the packet to the queue of the first packet processing thread, processing the packet in the first packet processing thread, and
causing the packet to be forwarded according to the predetermined order.

11. The non-transitory machine-readable storage medium of claim 8, wherein the packet is received after receipt of a preceding packet at the network device and wherein causing the packet to be forwarded according to the predetermined order further includes:
- determining whether the preceding packet is still to be processed by one of the plurality of packet processing threads;
- responsive to determining that the preceding packet is still to be processed, causing the packet to be stored in a buffer; and
- causing the packet to be output following processing and outputting of the preceding packet.

12. The non-transitory machine-readable storage medium of claim 11, wherein causing the packet to be forwarded according to the predetermined order further includes:
- determining that the packet has a load balancing flag set prior to causing the packet to be stored in the buffer.

13. The non-transitory machine-readable storage medium of claim 8, wherein the operations further comprise:
- assigning a unique sequence number to the packet, and wherein causing the packet to be forwarded is performed according to the unique sequence number.

14. The non-transitory machine-readable storage medium of claim 8, wherein the length of the queue of the first packet processing thread is monitored in part by measuring an exponentially weighted moving average (EWMA) of the length of the queue of the first packet processing thread and comparing a measurement with a threshold.

15. A network device comprising:
- a processor; and
- a non-transitory machine readable storage media with code stored therein which when executed by the processor performs the following operations:
  - receiving a packet at the network device, wherein the network device includes a plurality of packet processing threads,
  - assigning the packet to a first packet processing thread from the plurality of packet processing threads prior to adding the packet to a queue of the first packet processing thread, wherein each one of the plurality packet processing threads belongs to one of at least a normal pool of packet processing threads and a backlogged pool of packet processing threads,
  - determining a state of the first packet processing thread, wherein the state was set based on a monitoring of a length of the queue of the first packet processing thread, and wherein the state is determined to be one of a plurality of states including a backlogged state and a normal state and the state indicates which pool of packet processing threads the first packet processing thread belongs to,
  - responsive to determining that the state of the first packet processing thread is a normal state, performing the following:
    - adding, at the network device, the packet to the queue of the first packet processing thread,
    - processing the packet in the first packet processing thread, and
    - causing the packet to be forwarded, and
  - responsive to determining that the state of the first packet processing thread is a backlogged state, performing the following:
    - adding, at the network device, the packet to a queue of a second packet processing thread that is part of the backlogged pool of packet processing threads based on a load balancing scheme, wherein the backlogged pool of packet processing threads includes the first packet processing thread and a subset of packet processing threads from the plurality of packet processing threads, and the state of each one of the packet processing threads from the backlogged pool is the backlogged state,
    - processing the packet in the second packet processing thread, and
    - causing the packet to be forwarded according to a predetermined order, wherein the predetermined order is based on a position of the packet relative to positions of other packets at receipt of the packet and the other packets in the network device.

16. The network device of claim 15, wherein the packet is received after receipt of a preceding packet at the network device and wherein causing the packet to be forwarded according to the predetermined order further includes:
- determining whether the preceding packet is still to be processed by one of the plurality of packet processing threads;
- responsive to determining that the preceding packet is still to be processed, causing the packet to be stored in a buffer; and
- causing the packet to be output following processing and outputting of the preceding packet.

17. The network device of claim 15, wherein the operations further comprise:
- assigning a unique sequence number to the packet, and wherein causing the packet to be forwarded is performed according to the unique sequence number.

18. The network device of claim 15, wherein the network device is a forwarding element of a software-defined networking (SDN) system.

19. The network device of claim 15, wherein the network device is a general purpose network device of a system implementing network function virtualization (NFV).

* * * * *